US011155904B2

(12) United States Patent
Qiao et al.

(10) Patent No.: US 11,155,904 B2
(45) Date of Patent: Oct. 26, 2021

(54) COBALT-RICH WEAR RESISTANT ALLOY AND METHOD OF MAKING AND USE THEREOF

(71) Applicant: L.E. Jones Company, Menominee, MI (US)

(72) Inventors: Cong Yue Qiao, Menominee, MI (US); David M Doll, Houston, TX (US); Heidi Ziegler Doll, Houston, TX (US); Douglas W. Dooley, Menominee, MI (US); Daniel W. Bancroft, Menominee, MI (US)

(73) Assignee: L.E. Jones Company, Menominee, MI (US)

( * ) Notice: Subject to any disclaimer, the term of this patent is extended or adjusted under 35 U.S.C. 154(b) by 220 days.

(21) Appl. No.: 16/508,700

(22) Filed: Jul. 11, 2019

(65) Prior Publication Data

US 2021/0010113 A1   Jan. 14, 2021

(51) Int. Cl.
*C22C 38/10* (2006.01)
*C22C 38/52* (2006.01)
(Continued)

(52) U.S. Cl.
CPC .......... *C22C 38/105* (2013.01); *C22C 1/0433* (2013.01); *C22C 38/008* (2013.01);
(Continued)

(58) Field of Classification Search
CPC ..... C22C 19/07; C22C 1/0433; C22C 38/008; C22C 38/105; C22C 38/44; C22C 38/46;
(Continued)

(56) References Cited

U.S. PATENT DOCUMENTS

| 1,057,828 A | 4/1913 | Haynes |
| 2,030,342 A | 2/1936 | Wissler |

(Continued)

FOREIGN PATENT DOCUMENTS

| CN | 86108289 A | 8/1987 |
| CN | 1374410 A | 10/2002 |

(Continued)

OTHER PUBLICATIONS

Y.S. Wang et al., "Wear and Wear Mechanism Simulation of Heavy-Duty Engine Intake Valve and Seat Inserts", Journal of Materials Engineering and Performance, vol. 7 (1), Feb. 1998, p. 53.
(Continued)

*Primary Examiner* — Jenny R Wu
(74) *Attorney, Agent, or Firm* — Buchanan Ingersoll & Rooney PC

(57) ABSTRACT

A cobalt-rich wear resistant and corrosion resistant alloy useful for parts of a combustion engine such as valve seat inserts includes, in weight % about 0.1 to about 0.8% C, about 0.1 to about 1.5% Mn, about 3 to about 5% Si, about 10 to about 20% Cr, about 5 to about 32% Fe, about 0.5 to about 4% W, about 10 to about 30% Mo, up to about 20% Ni, about 20 to about 40% Co, up to about 6% V, up to about 3% Nb, total V plus Nb of about 0.5 to about 8.5% and balance unavoidable impurities including up to 0.035% P, up to 0.015% S and up to 0.250% N.

19 Claims, 10 Drawing Sheets

(51) Int. Cl.

| | | |
|---|---|---|
| *C22C 38/48* | (2006.01) | |
| *C22C 38/46* | (2006.01) | |
| *C22C 38/44* | (2006.01) | |
| *C22C 38/00* | (2006.01) | |
| *C22C 1/04* | (2006.01) | |
| *F04B 53/10* | (2006.01) | |

(52) U.S. Cl.
CPC .............. *C22C 38/44* (2013.01); *C22C 38/46* (2013.01); *C22C 38/48* (2013.01); *C22C 38/52* (2013.01); *F04B 53/1087* (2013.01)

(58) Field of Classification Search
CPC ...... C22C 38/48; C22C 38/52; F01L 2301/00; F01L 2303/00; F01L 2820/01; F01L 3/02; F04B 53/1087; F16K 25/005
See application file for complete search history.

(56) References Cited

U.S. PATENT DOCUMENTS

| | | | |
|---|---|---|---|
| 2,103,500 | A | 12/1937 | Touceda |
| 2,763,547 | A | 9/1956 | Dyrkacz et al. |
| 3,180,012 | A | 4/1965 | Smith |
| 3,356,542 | A | 12/1967 | Smith |
| 3,410,732 | A | 11/1968 | Smith |
| 3,432,294 | A | 3/1969 | Wheaton |
| 3,795,430 | A | 3/1974 | Farley |
| 3,839,024 | A | 10/1974 | Demo, Jr. et al. |
| 3,865,585 | A | 2/1975 | Rademacher |
| 4,147,538 | A * | 4/1979 | Yajima .................. C22C 49/08 528/31 |
| 4,325,994 | A | 4/1982 | Kitashima et al. |
| 4,692,305 | A | 9/1987 | Rangaswamy et al. |
| 4,711,763 | A | 12/1987 | Lai |
| 4,728,495 | A | 3/1988 | Rademacher |
| 5,002,731 | A | 3/1991 | Crook et al. |
| 5,462,575 | A | 10/1995 | Corso |
| 6,082,317 | A | 7/2000 | Takahashi |
| 6,298,817 | B1 | 10/2001 | Hoeg |
| 6,793,878 | B2 | 9/2004 | Blake et al. |
| 6,852,176 | B2 | 2/2005 | Wu et al. |
| 7,569,116 | B2 | 8/2009 | Ono et al. |
| 7,572,408 | B2 | 8/2009 | Wu et al. |
| 7,588,650 | B2 | 9/2009 | Baba et al. |
| 7,754,143 | B2 | 7/2010 | Qiao et al. |
| 8,075,839 | B2 | 12/2011 | Srivastava |
| 8,167,270 | B2 | 5/2012 | Takei et al. |
| 8,383,203 | B2 | 2/2013 | Belhadjhamida et al. |
| 8,603,264 | B2 | 12/2013 | Wu et al. |
| 9,078,753 | B2 | 7/2015 | Yao et al. |
| 10,273,838 | B2 | 4/2019 | Ikemi et al. |
| 2003/0177863 | A1 | 9/2003 | Koyama |
| 2004/0011435 | A1 | 1/2004 | Wu et al. |
| 2004/0057863 | A1 | 3/2004 | Wu et al. |
| 2005/0193861 | A1 | 9/2005 | Sato et al. |
| 2008/0066831 | A1 | 3/2008 | Srivastava |
| 2009/0257906 | A1 | 10/2009 | Qiao |
| 2009/0317286 | A1 | 12/2009 | Nishi |
| 2010/0104440 | A1 | 4/2010 | Torigoe et al. |
| 2013/0221261 | A1 | 8/2013 | Otobe et al. |
| 2016/0245132 | A1 | 8/2016 | Qiao et al. |
| 2016/0375494 | A1 | 12/2016 | Beerens et al. |
| 2018/0066342 | A1 | 3/2018 | Kamo et al. |

FOREIGN PATENT DOCUMENTS

| | | |
|---|---|---|
| CN | 105603260 A | 5/2016 |
| CN | 105734345 A | 7/2016 |
| CN | 106756257 A | 5/2017 |
| EP | 2130933 A1 | 12/2009 |
| EP | 2638323 A1 | 9/2013 |
| EP | 3293277 A1 | 3/2018 |
| EP | 3 444 452 A1 | 2/2019 |
| FR | 2149076 A5 | 3/1973 |
| GB | 1390684 A | 4/1975 |
| JP | S 5320796 A | 2/1978 |
| JP | S 5576036 A | 6/1980 |
| JP | S 55148741 A | 11/1980 |
| JP | S 59133343 A | 7/1984 |
| JP | S 60116741 A | 6/1985 |
| JP | S 613860 A | 1/1986 |
| JP | S 6223951 A | 1/1987 |
| JP | S 6230837 A | 2/1987 |
| JP | S 6237357 A | 2/1987 |
| JP | S 62164844 A | 7/1987 |
| JP | H 0196350 A | 4/1989 |
| JP | H 01272738 A | 10/1989 |
| JP | H 02236239 A | 9/1990 |
| JP | H 02236240 A | 9/1990 |
| JP | H 04159405 A | 6/1992 |
| JP | H 04254541 A | 9/1992 |
| JP | H 04254542 A | 9/1992 |
| JP | H 04254543 A | 9/1992 |
| JP | H 0617177 A | 1/1994 |
| JP | H 06145856 A | 5/1994 |
| JP | H 06171166 A | 6/1994 |
| JP | H 07179967 A | 7/1995 |
| JP | H 09206986 A | 8/1997 |
| JP | 2006299404 A | 11/2006 |
| JP | WO 2012063512 A1 | 5/2014 |
| JP | 2017025921 A | 2/2017 |
| WO | WO 84-02928 A1 | 8/1984 |
| WO | WO 2014101772 A1 | 7/2014 |

OTHER PUBLICATIONS

"Valve Seat Insert", http://ssvalues.net/Valve_Seat.aspx; printed Nov. 9, 2017, 2 pages.

Y.S. Wang et al., "Engine Valve and Seat Insert Wear Study With a Simulator", Science In China, Series A; vol. 44 Supp., Aug. 2001, pp. 235-237.

L. Carley, "Valve Seat Replacement Cylinder Head Valve Seat Installation", http://www.rlengines.com/Web_Pages/Valve_Seat_Installation.html, printed Nov. 9, 2017, 5 pages.

L.E. Jones Company, "The Finest Finished Inserts ... Most Suitable Materials—Material Development," http://www.lejones.com/engineering-services/material-development, printed Nov. 9, 2017, 4 pages.

L.E. Jones Company, "A Comparative Tensile Rupture Strength Evaluation for Alloy J580 System", printed Jul. 27, 2019, 2 pages.

P.L. Hurricks, "Some Metallurgical Factors Controlling the Adhesive and Abrasive Wear Resistance of Steels—A Review", Wear, vol. 26, 1973, pp. 285-304.

ASM Handbook, vol. 3, "Alloy Phase Diagrams", ASM International, Materials Park, Ohio 44073-0002, Jan. 1997.

"Driving up the Demand for Cobalt", Metal Bulletin Magazine, pp. 52-55, sub@metallbulletin.com, Dec. 2017-Jan. 2018.

E.E. Stansbury and R.A. Buchanan, "Fundamentals of Electrochemical Corrosion", ASM International, Materials Park, Ohio, Jul. 2000, 2 pages.

C. Qiao, "Wear-resistance Assessment for Heavy-duty Internal Combustion Engine Valvetrain Materials Application", pp. 159-168, Tribo-Corrosion: Research, Testing, and Applications, STP 1563, 2013.

SAE International: "Surface Vehicle Information Report—Valve Seat Insert Information Report," SAE J1692, issued Aug. 30, 1993, https://www.sae.org/standards/content/j1692_199308. Retrieved Dec. 10, 2018, 22 pages.

Extended European Search Report dated Oct. 2, 2020 in corresponding European Patent Application No. 20184911.4-1108, 7 pages.

* cited by examiner

COBALT-RICH WEAR RESISTANT ALLOY AND METHOD OF MAKING AND USE THEREOF

FIELD OF THE INVENTION

The present invention relates to wear resistant alloys useful for applications such as valve seat inserts of internal combustion engines.

BACKGROUND

In the field of internal combustion engines, iron-based alloys and nickel-based alloys have been developed for engine parts such as valve seat inserts. Although there has been some development of cobalt-based alloys for such applications, fewer cobalt-based alloy systems have been commercialized due to the high cost of cobalt. Although cobalt-based alloys have the potential for achieving required heat resistance, corrosion resistance and wear resistance of VSI applications, there is a need for lower cost cobalt-based alloys suitable for VSI applications.

SUMMARY

Disclosed herein is a cobalt-rich alloy (referred to herein as "J580") useful for VSI applications wherein the alloy comprises, in weight percent (%), about 0.1 to about 0.8% C, about 0.1 to about 1.5% Mn, about 3 to about 5% Si, about 10 to about 20% Cr, about 5 to about 32% Fe, about 0.5 to about 4% W, about 10 to about 30% Mo, up to about 20% Ni, about 20 to about 40% Co, up to about 6% V, up to about 3% Nb, total V plus Nb of about 0.5 to about 8.5%, balance unavoidable impurities including up to 0.035% P, up to 0.015% S and up to 0.250% N.

In an embodiment, the cobalt-rich alloy comprises, in weight percent (%), about 0.18 to about 0.52% C, about 0.7 to about 1.2% Mn, about 3.5 to about 4.6% Si, about 11 to about 15% Cr, about 16 to about 27% Fe, about 1 to about 1.5% W, about 19 to about 23% Mo, about 0.7 to about 4% Ni, about 26 to about 36% Co, about 1.3 to about 4% V, about 1.2 to about 2.3% Nb, balance unavoidable impurities including up to 0.035% P, up to 0.015% S and up to 0.250% N.

The cobalt-rich alloy can have a bulk hardness which exhibits less than 10% hardness variation as a function of tempering below 1500° F.

The cobalt-rich alloy can have a vanadium content of about 1.3 to about 3.6% which solution phase matrix with optional Laves phase. The cobalt-rich alloy can include MC type carbide formers such as V and Nb in an amount of up to about 9 wt. %, such as about 0.5 to about 8.5 wt. % or about 3 to about 5 wt. %.

BRIEF DESCRIPTION OF THE DRAWINGS

FIGS. 6-8 are graphs of dimensional change versus temperature wherein FIG. 6 is a graph of dimensional change versus temperature for J3, FIG. 7 is a graph of dimensional change versus temperature for J10, and FIG. 8 is a graph of dimensional change versus temperature for J580.

FIGS. 13-15 show Plint wear test results for J10 and three J580 alloys wherein FIG. 13 shows pin specimen wear, FIG. 14 shows plate specimen wear, and FIG. 15 shows total materials wear.

DETAILED DESCRIPTION

Figure 1:
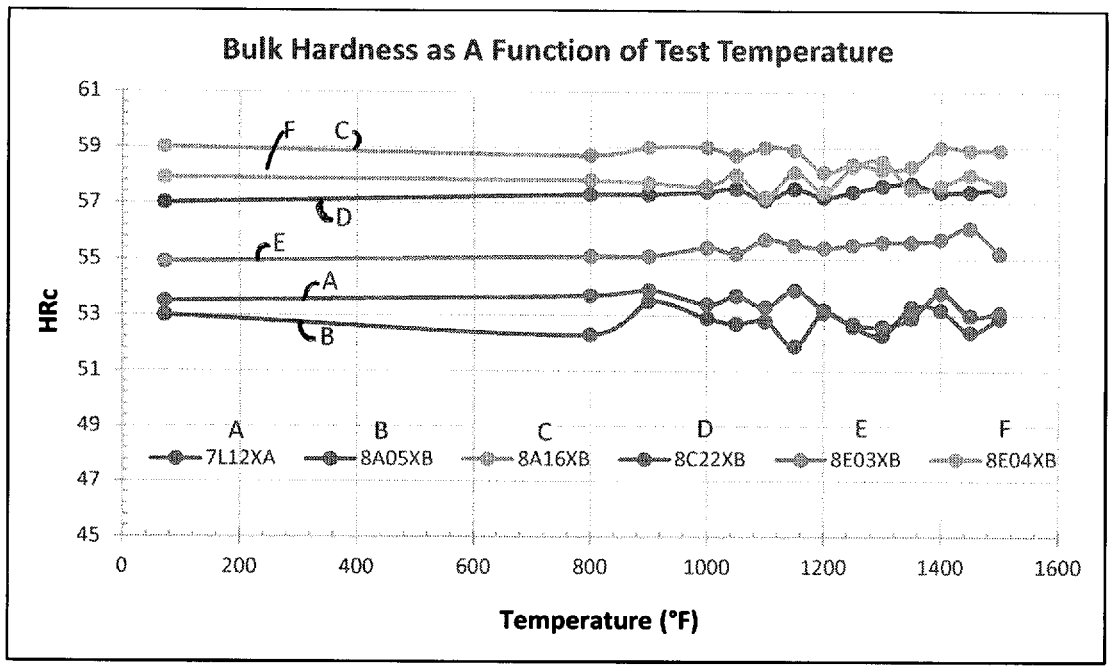
FIG. 1 is a graph of bulk harness as a function of tempering temperature for several J580 alloy compositions.

Disclosed herein is a cobalt-rich alloy (referred to herein as "J580" or "J580 alloy"). The J580 alloy is designed as a cost effective alloy which exhibits wear resistance and corrosion resistance along with an improved thermal shock resistance and machinability. The J580 alloy can exhibit desirable hardness, microhardness, and hardness distribution in a casting component, such as a valve seat insert ("VSI").

In developing the J580 alloy, various alloy compositions were evaluated for mechanical properties and microstructure. The J580 alloy composition can be tailored to achieve desired mechanical properties of VSIs such as bulk hardness, radial crush strength, dimensional change, compressive yield strength, tensile rupture strength, corrosion resistance, and wear resistance. To achieve desired performance objectives of VSIs, the J580 alloy composition can be tailored to provide a microstructure having a cobalt solid solution phase, eutectic phases, Laves phase, and MC type carbides. For example, the J580 alloy can have a microstructure with two primary matrix phases (lamellar shaped eutectic reaction phases and Laves phases) and fine MC type carbides for strengthening. Cobalt can form intermetallic phases with molybdenum and Sigma phase with chromium, iron can form intermetallic phases with molybdenum and chromium, and silicon can form intermetallic phases with cobalt, molybdenum, chromium and iron. In addition, nickel can be added to form inclusions to reduce the grain size of the matrix phase. Thus, in the J580 alloy, the alloy elements and ranges can be controlled to form intermetallic phases in addition to the Laves phase in the matrix to reduce the volume percent of cobalt solid solution phase by controlling the iron and silicon additions to the J580 alloy. Compared to the J10 alloy (a Co-base alloy available from L.E. Jones, the assignee of the present application) having about 60% cobalt and a matrix of about 50 vol. % Laves phases and about 50 vol. % cobalt solid solution phases, the J580 alloy which has a much lower Co content, can provide a VSI having a more homogenized microhardness distribution across a component cross section.

Table 1 summarizes experimental J580 heats for various alloy compositions. Six of the heats were adopted to make a standard VSI test rings for some basic materials testing including temper response, bulk hardness, radial crush toughness, and corrosion. The basic geometric dimensions of the test VSI samples are: 1.935" (49.15 mm) OD, 1.570" (39.88 mm) ID, and 0.3020" (7.67 mm) in height.

TABLE 1

Summary of J580 Alloy Compositions in Weight %

| Heat No. | C | Si | Mn | Ni | Cr | Mo | W | V | Co | Fe | P | S | Nb |
|---|---|---|---|---|---|---|---|---|---|---|---|---|---|
| 8E11XC | 0.485 | 4.19 | 0.71 | 3.42 | 12.06 | 21.74 | 1.30 | 3.97 | 27.03 | 22.97 | 0.024 | 0.005 | 1.67 |
| 8E04XB | 0.185 | 4.40 | 0.95 | 0.95 | 14.81 | 22.12 | 1.45 | 3.57 | 29.67 | 19.21 | 0.026 | 0.004 | 2.26 |
| 8E04XA | 0.187 | 3.84 | 0.95 | 0.74 | 14.83 | 21.89 | 1.39 | 3.79 | 30.93 | 19.08 | 0.027 | 0.005 | 1.95 |
| 8E03XB | 0.508 | 4.35 | 0.82 | 3.44 | 12.39 | 21.56 | 1.25 | 3.57 | 27.39 | 22.67 | 0.023 | 0.006 | 1.59 |
| 8E03XA | 0.481 | 4.29 | 0.80 | 3.53 | 11.86 | 21.58 | 1.29 | 4.25 | 26.52 | 23.34 | 0.023 | 0.005 | 1.60 |
| 8C22XB | 0.447 | 4.62 | 0.71 | 3.20 | 13.51 | 21.78 | 1.20 | 1.30 | 35.45 | 16.13 | 0.024 | 0.006 | 1.25 |
| 8C22XA | 0.489 | 4.45 | 0.76 | 3.16 | 13.91 | 21.44 | 1.17 | 1.52 | 35.08 | 16.46 | 0.025 | 0.005 | 1.16 |
| 8B15XA | 0.362 | 4.85 | 0.80 | 3.38 | 13.29 | 21.42 | 1.25 | 1.57 | 36.12 | 15.20 | 0.026 | 0.005 | 1.38 |
| 8B13XA | 0.412 | 4.45 | 0.99 | 0.53 | 19.29 | 19.38 | 1.33 | 3.77 | 28.74 | 20.57 | 0.022 | 0.004 | 0.10 |
| 8A16XB | 0.444 | 4.58 | 1.06 | 0.78 | 13.95 | 22.59 | 1.35 | 3.35 | 30.31 | 19.21 | 0.025 | 0.004 | 1.97 |
| 8A16XA | 0.404 | 4.35 | 1.01 | 0.82 | 13.84 | 23.35 | 1.33 | 3.43 | 29.60 | 19.75 | 0.024 | 0.004 | 1.70 |
| 8A05XB | 0.416 | 4.56 | 1.15 | 2.70 | 13.41 | 18.98 | 1.05 | 2.15 | 26.61 | 27.12 | 0.025 | 0.003 | 1.36 |
| 8A05XA | 0.430 | 4.21 | 1.10 | 3.55 | 12.35 | 22.22 | 1.05 | 2.02 | 28.68 | 22.63 | 0.025 | 0.003 | 1.32 |
| 7L19XA | 0.379 | 4.37 | 0.93 | 0.92 | 13.21 | 22.75 | 1.43 | 3.08 | 37.31 | 13.66 | 0.026 | 0.004 | 1.61 |
| 7L12XB | 0.353 | 4.57 | 0.95 | 0.91 | 13.29 | 22.75 | 1.42 | 3.08 | 37.20 | 13.54 | 0.026 | 0.004 | 1.59 |
| 7L12XA | 0.514 | 3.57 | 0.98 | 3.92 | 11.80 | 21.25 | 1.06 | 1.84 | 28.55 | 24.52 | 0.024 | 0.004 | 1.52 |
| 7L09XA | 0.526 | 3.92 | 1.13 | 3.94 | 11.16 | 21.12 | 1.07 | 1.87 | 28.44 | 24.82 | 0.024 | 0.003 | 1.54 |

The J580 alloys listed in Table 1 have about 0.18 to about 0.55% C, about 3.5 to about 5% Si, about 0.2 to about 1.2% Mn, about 11 to about 20% Cr, about 13 to about 28% Fe, about 1 to about 1.5% W, about 18 to about 23% Mo, about 0.5 to about 4% Ni, about 26 to about 38% Co, about 1.5 to about 4.3% V, about 0.1 to about 2.3% Nb, balance unavoidable impurities including up to 0.035% P, up to 0.015% S and up to 0.250% N.

VSI ring samples were made using six of the heats (8E04 XB, 8E03XB, 8C22XB, 8A16XB, 8A05XB, 7L12XA) listed in Table 1. These six VSI ring samples were evaluated for bulk hardness and radial crush strength. Per the alloy design concepts, the bulk hardness of J580 within the alloying elemental ranges investigated did not show significant hardness variation as a function of tempering temperature when the temperature is below 1500° F. The tempering response tested using the samples made of the six heats (see Table 1) confirmed that there was no significant bulk hardness variation (as a non-allotropic system) in the J580 alloy heats. Nevertheless, it has been clearly demonstrated that several alloying elements had significant influences to J580 alloy system in terms of the level of bulk hardness can be achieved. With an assumption that cobalt and iron together can be treated as a combination of "primary matrix elements" in J580 alloy system, then, the effect of carbon, nickel, chromium, molybdenum, and vanadium to bulk hardness has been analyzed. Applying a linear regression method, Equation 1 provides an estimate of the average bulk hardness as a function of several alloying elements can be expressed as:

$$HRc_{bulk} = 71.6378 + 6.34391C - 2.16431Ni - 1.30782Cr + 0.591747Mo - 3.12869V \quad \text{Equation 1:}$$

Figure 2:
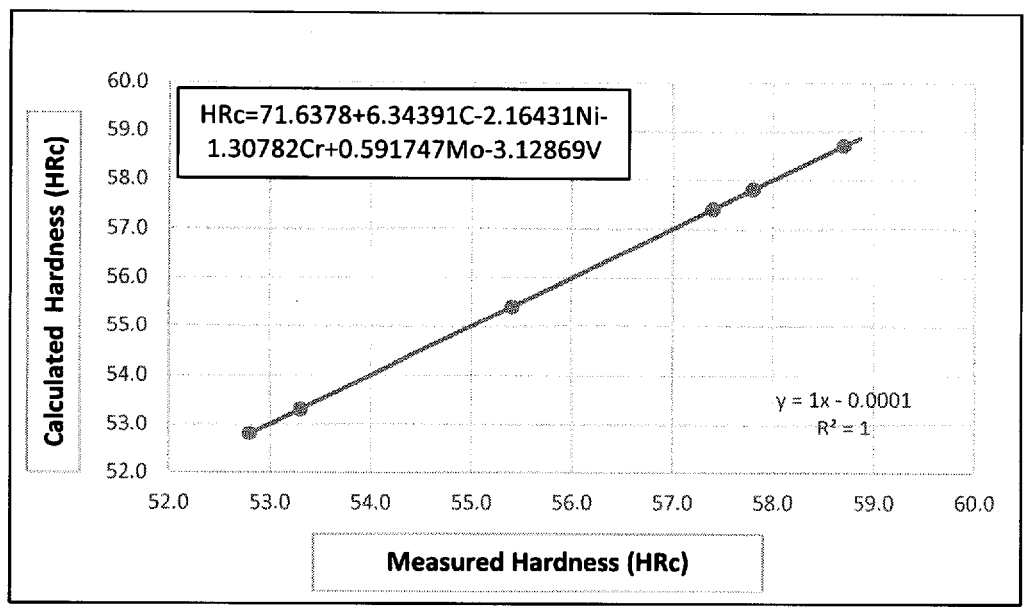
FIG. 2 shows a correlation between measured bulk hardness and calculated bulk hardness.

The test results for bulk hardness measurements as a function of tempering temperature are shown in FIG. 1. Table 2 lists the bulk hardness values for the six samples at various tempering temperatures. FIG. 2 shows a correlation between measured bulk hardness and calculated bulk hardness.

TABLE 2

Hardness Measurement Results Versus Tempering Temperature

| Tempering Temperature | | Bulk Hardness (HRc) | | | | | |
|---|---|---|---|---|---|---|---|
| ° F. | ° C. | 7L12XA | 8A05XB | 8A16XB | 8C22XB | 8E03XB | 8E04XB |
| 72 | 22 | 53.5 | 53.0 | 59.0 | 57.0 | 54.9 | 57.9 |
| 800 | 427 | 53.7 | 52.3 | 58.7 | 57.3 | 55.1 | 57.8 |
| 900 | 482 | 53.9 | 53.5 | 59.0 | 57.3 | 55.1 | 57.7 |
| 1000 | 538 | 53.4 | 52.9 | 59.0 | 57.4 | 55.4 | 57.6 |
| 1050 | 566 | 53.7 | 52.7 | 58.7 | 57.5 | 55.2 | 58.0 |
| 1100 | 593 | 53.3 | 52.8 | 59.0 | 57.1 | 55.7 | 57.2 |
| 1150 | 621 | 53.9 | 51.9 | 58.9 | 57.5 | 55.5 | 58.1 |
| 1200 | 649 | 53.2 | 53.1 | 58.1 | 57.2 | 55.4 | 57.4 |
| 1250 | 677 | 52.7 | 52.6 | 58.4 | 57.4 | 55.5 | 58.3 |
| 1300 | 704 | 52.6 | 52.3 | 58.2 | 57.6 | 55.6 | 58.5 |
| 1350 | 732 | 52.9 | 53.3 | 58.3 | 57.7 | 55.6 | 57.5 |
| 1400 | 760 | 53.8 | 53.2 | 59.0 | 57.4 | 55.7 | 57.6 |
| 1450 | 788 | 53.0 | 52.4 | 58.9 | 57.4 | 56.1 | 58.0 |
| 1500 | 816 | 53.1 | 52.9 | 58.9 | 57.5 | 55.2 | 57.6 |
| | Average | 53.3 | 52.8 | 58.7 | 57.4 | 55.4 | 57.8 |

Figure 3:
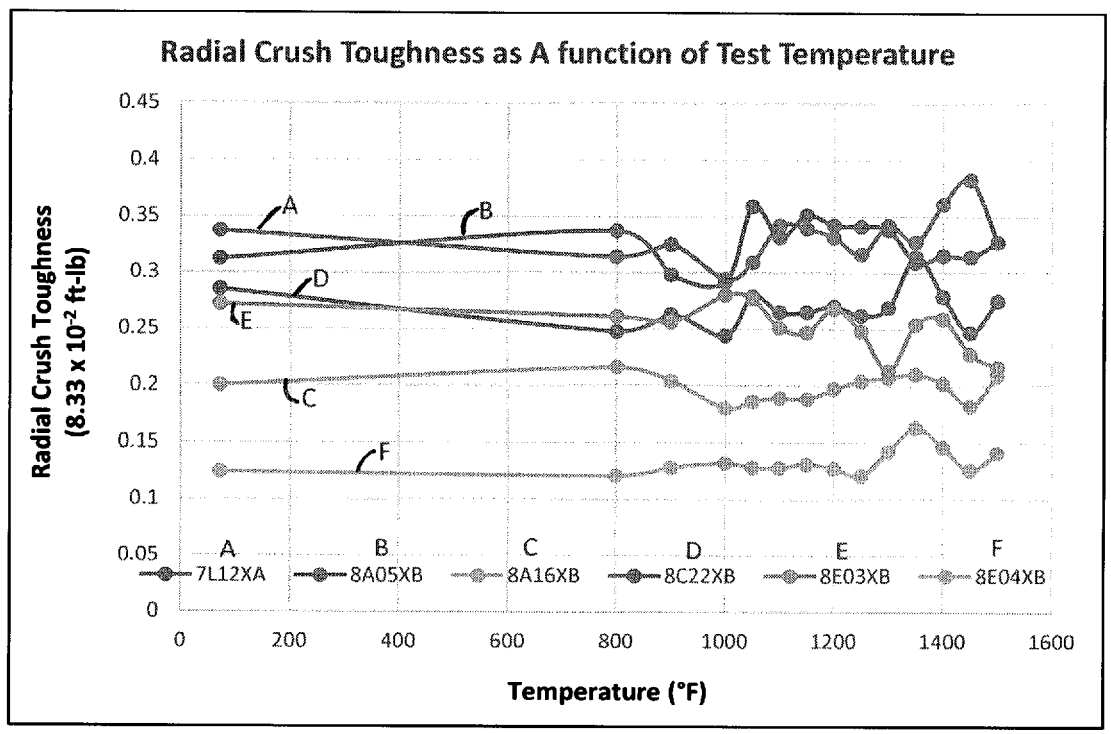
FIG. 3 is a graph of radial crush toughness as a function of tempering temperature for several J580 alloy compositions.
Figure 4:
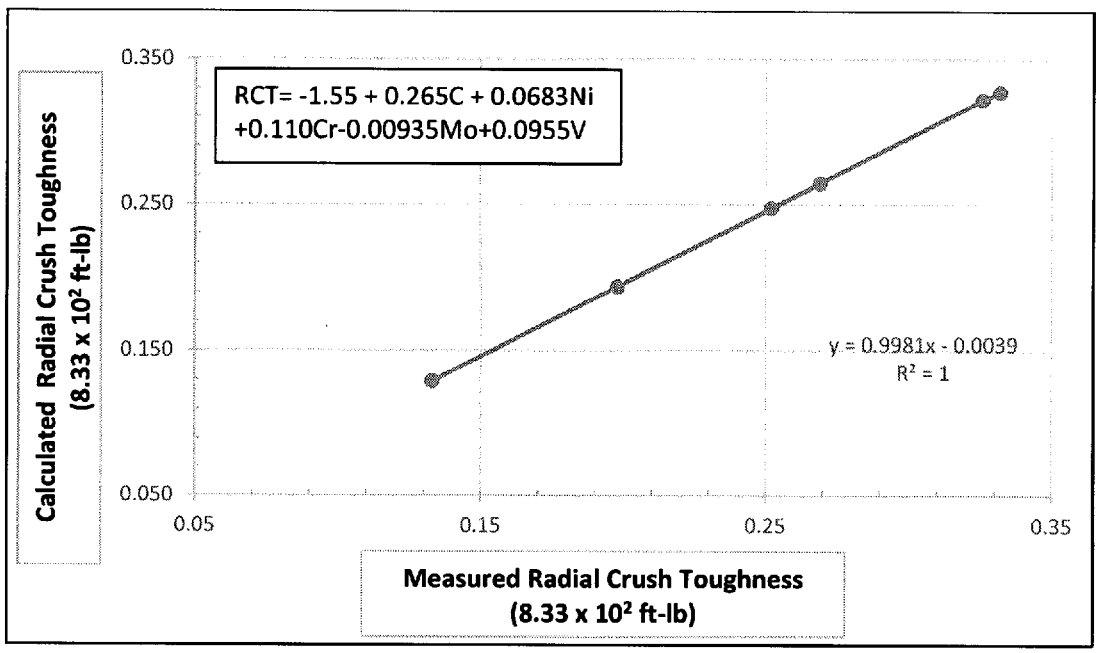
FIG. 4 shows a correlation between measured radial crush toughness and calculated radial crush toughness.

Table 3 summarizes the radial toughness measurement results for six heats of J580. The radial crush toughness as a function of tempering temperature for all six heats evaluated is shown in FIG. 3. As with the relationship between bulk hardness and tempering temperature, the radial crush test as a function of tempering temperature showed a similar trend for each heat involved. For a mathematic simulation purpose, an average radial crush test toughness index is applied to perform this linear regression study. Equation 2 provides an estimate of the radial crush toughness simulation results for J580 alloy system wherein alloying elements such as carbon, nickel, chromium, and vanadium are effective to enhance the toughness while molybdenum exhibits a negative effect to J580 radial crush toughness. In Equation 2, RCT is radial crush toughness. FIG. 4 shows a correlation between measured RCT and calculated RCT.

$$RCT = -1.55 + 0.265C + 0.0683Ni + 0.11Cr - 0.00935Mo + 0.0955V \quad \text{Equation 2:}$$

TABLE 3

Radial Crush Toughness Versus Tempering Temperature

| Tempering Temperature | | Radial Crush Toughness Index ($8.33 \times 10^{-2}$ ft-lb) | | | | | |
|---|---|---|---|---|---|---|---|
| °F. | °C. | 7L12XA | 8A05XB | 8A16XB | 8C22XB | 8E03XB | 8E04XB |
| 72 | 22 | 0.337 | 0.312 | 0.200 | 0.285 | 0.272 | 0.124 |
| 800 | 427 | 0.314 | 0.337 | 0.216 | 0.248 | 0.261 | 0.121 |
| 900 | 482 | 0.325 | 0.298 | 0.204 | 0.263 | 0.256 | 0.128 |
| 1000 | 538 | 0.294 | 0.292 | 0.180 | 0.244 | 0.280 | 0.132 |
| 1050 | 566 | 0.309 | 0.359 | 0.186 | 0.279 | 0.277 | 0.128 |
| 1100 | 593 | 0.342 | 0.331 | 0.189 | 0.265 | 0.251 | 0.128 |
| 1150 | 621 | 0.339 | 0.351 | 0.188 | 0.265 | 0.247 | 0.131 |
| 1200 | 649 | 0.331 | 0.342 | 0.197 | 0.270 | 0.268 | 0.127 |
| 1250 | 677 | 0.316 | 0.341 | 0.204 | 0.262 | 0.248 | 0.121 |
| 1300 | 704 | 0.342 | 0.338 | 0.207 | 0.269 | 0.213 | 0.142 |
| 1350 | 732 | 0.327 | 0.309 | 0.210 | 0.314 | 0.254 | 0.163 |
| 1400 | 760 | 0.361 | 0.315 | 0.202 | 0.279 | 0.259 | 0.146 |
| 1450 | 788 | 0.383 | 0.314 | 0.182 | 0.247 | 0.228 | 0.126 |
| 1500 | 816 | 0.327 | 0.327 | 0.209 | 0.275 | 0.216 | 0.141 |
|  | Average | 0.332 | 0.326 | 0.198 | 0.269 | 0.252 | 0.133 |

For the J580 alloy system, the average radial crush toughness and average bulk hardness from ambient through 1500° F. (816° C.) showed a reasonably good correlation which can be expressed by Equation 3 (below) where Y represents average radial crush toughness and "x" represents average bulk hardness.

$$Y = 0.0009x^2 - 0.1221x + 4.3741. \quad \text{Equation 3:}$$

Figure 5:
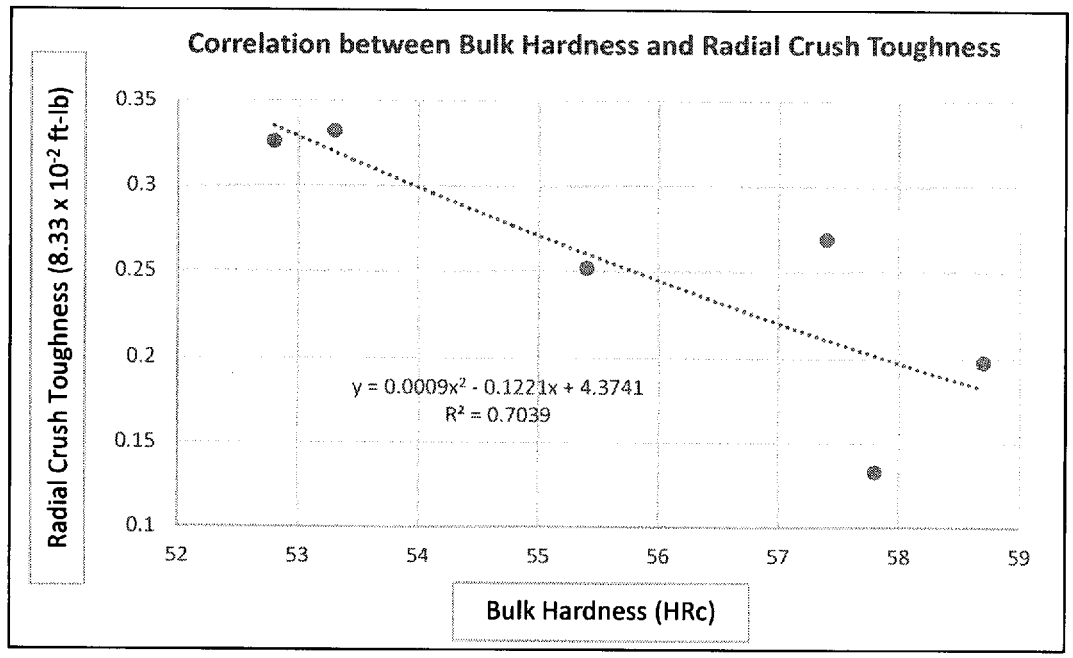
FIG. 5 is a graph of radial crush toughness versus bulk hardness.

Within a bulk hardness range (HRc 50 to HRc 65) which is of most interest for the intended alloy applications, the radial crush toughness index value was within a range of 0.17 to 0.35 ($8.33 \times 10^2$ ft-lb) which is a suitable range for the intended alloy application. It is hinted by Equation 3, that an increase in bulk hardness of J580 decreases the radial crush toughness but at a non-linear and slower rate than the increment rate of bulk hardness. FIG. 5 shows a correlation between bulk hardness and RCT.

Dimensional stability tests were conducted to evaluate the J580 Alloy. The dimensional stability test conditions include 20 hours heat soaking at 1200° F. followed by slow air cooling for the J580 alloy evaluation. The outer diameter ("OD") dimension was measured prior to and after the thermal treatment from two perpendicular radial orientations. For the dimensional stability test, an OD dimensional change smaller than 0.0005 inches is considered PASS. Table 4 summarizes the dimensional stability test results. It is clearly demonstrated that a sound dimensional stability is possessed in the J580 alloy.

TABLE 4

Dimensional Stability Test Results

| | OD Dimensional Measurement Results (inch) | | | | | | |
|---|---|---|---|---|---|---|---|
| Material: J580 Heat 8E03XB Sample | Reading Before Thermal Treatment at 0° | Reading Before Thermal Treatment at 90° | Reading After Thermal Treatment at 0° | Reading After Thermal Treatment at 90° | Δ in Reading at 0° | Δ in Reading at 90° | Result (Pass or Fail) |
| 1 | 1.93850 | 1.93760 | 1.93850 | 1.93780 | 0.00000 | 0.00020 | Pass |
| 2 | 1.93830 | 1.93840 | 1.93820 | 1.93845 | −0.00010 | 0.00005 | Pass |
| 3 | 1.93830 | 1.93810 | 1.93825 | 1.93810 | −0.00005 | 0.00000 | Pass |
| 4 | 1.93790 | 1.93870 | 1.93790 | 1.93865 | 0.00000 | −0.00005 | Pass |
| 5 | 1.93820 | 1.93840 | 1.93820 | 1.93830 | 0.00000 | −0.00010 | Pass |
| Average | 1.93824 | 1.93824 | 1.93821 | 1.93826 | −0.00003 | 0.00002 | Pass |

* Thermal soaking condition - 20 hours at 1200° F.

Table 5 summarizes the dilatometry analysis results for five heats of the J580 alloy along with typical thermal expansion coefficient for cobalt-based VSI alloys J3 and J10 (both available from L. E. Jones, the assignee of this application). It is clearly shown that the J580 heats possess similar CTEs as the J3 and J10 cobalt-based alloys. The temperature increment (or decrement) rate was 3°/min for all the tests. The information in Table 5 indicates that alloying elemental concentration investigated can affect thermal expansion and contraction behavior but the variations observed are relatively small. One of the primary factors affecting the level of thermal expansion and contraction behavior in the J580 alloy is the combined matrix elements, cobalt and iron along with the ratio of cobalt to iron.

TABLE 5

Thermal Expansion Coefficient For J3, J10, J580 Alloys in mm/mm° C.:

| Reference Temperature (° C.) | Reporting Temperature (° C.) | 7L12XA | 7L12XB | 8A05XA | 8A16XA | 8B13XA | J3 | J10 |
|---|---|---|---|---|---|---|---|---|
| 25 | 100 | 12.2 | 11.2 | 12.2 | 11.6 | 11.7 | 10.9 | 10.6 |
| 25 | 200 | 12.8 | 11.7 | 12.9 | 12.8 | 12.8 | 12.1 | 11.6 |
| 25 | 300 | 13.1 | 12.0 | 13.2 | 13.1 | 13.1 | 12.5 | 11.9 |
| 25 | 400 | 13.3 | 12.3 | 13.4 | 13.2 | 13.3 | 12.9 | 12.2 |
| 25 | 500 | 13.6 | 12.6 | 13.6 | 13.4 | 13.5 | 13.2 | 12.5 |
| 25 | 600 | 14.0 | 12.9 | 13.9 | 13.7 | 13.9 | 13.4 | 12.8 |
| 25 | 700 | 14.3 | 13.3 | 14.1 | 14.0 | 14.4 | 13.9 | 13.3 |
| 25 | 800 | 14.5 | 13.6 | 14.3 | 14.3 | 14.8 | 14.3 | 13.7 |
| 25 | 900 | 14.7 | 13.8 | 14.5 | 14.4 | 15.1 | 14.3 | 14.0 |
| 25 | 1000 | 14.9 | 14.1 | 14.6 | 14.4 | 15.4 | 14.4 | 14.2 |

Figure 6:
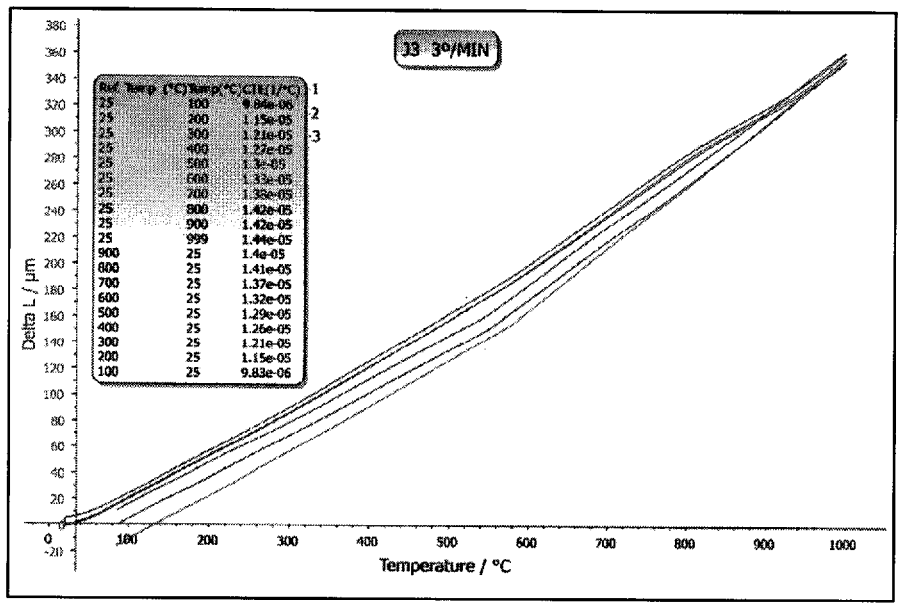
Figure 7:
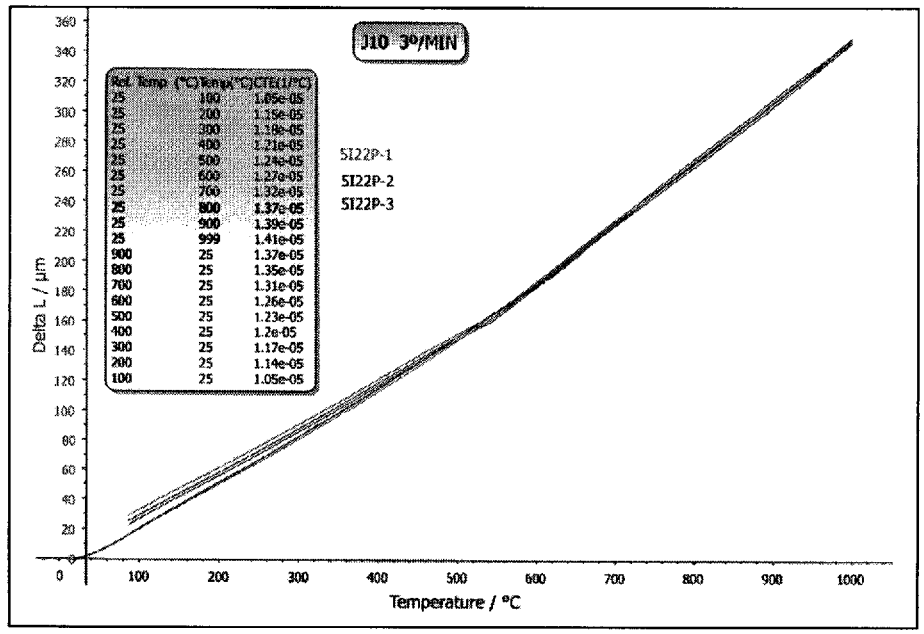
Figure 8:
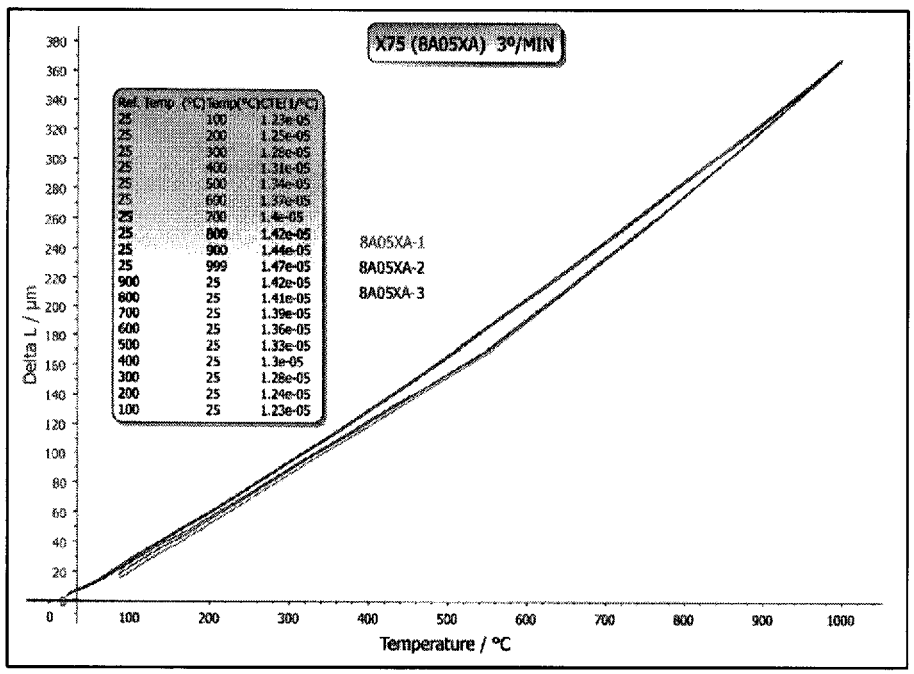

From on-heating and on-cooling behavior among J3 (FIG. 6), J10 (FIG. 7), and J580 (FIG. 8), it is evident that J10 and J580 showed similar behavior while J3 showed a slightly different behavior in terms of dimensional changing rate between on-heating and on-cooling portion of a thermal exposure. The space separating on-heating and on-cooling curve shown in J3 indicates that a significant permanent deformation has taken place during on-heating thermal soaking. On the contrary, J10 and J580 showed a very small gap between on-heating and on-cooling curves that is an indication of stable microstructures and no significant solid state phase transformation has taken place. From a general VSI dimensional stability consideration, the dimensional gap at the ambient after heating then cooling cycle is an indicator of an alloy dimensional stability for VSI applications.

Figure 9:
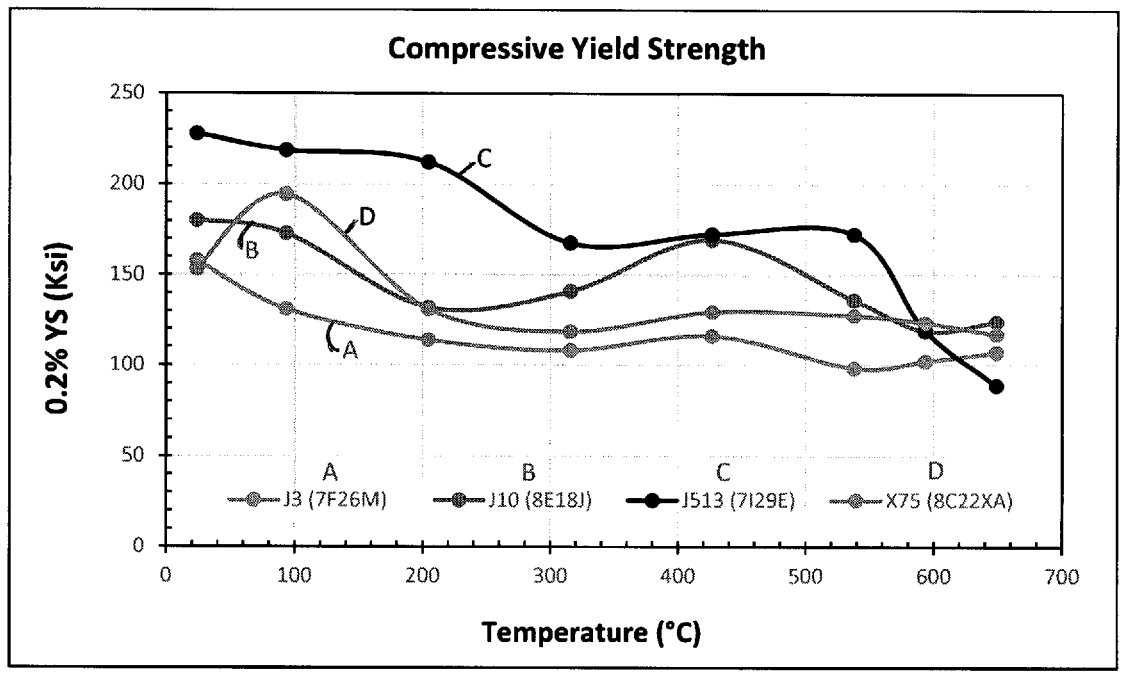
FIG. 9 is a graph of compressive yield strength versus temperature for several J580 alloy compositions for J580, J3, J10 and J153.

Compressive yield strength and tensile strength were evaluated for the J580 alloy. Compressive yield strength is a desired property for VSI applications. Compared to an iron-based or nickel-based alloy, especially for iron-based alloys with martensitic or ferritic microstructures, there is a threshold temperature at which compressive yield strength tends to drop rapidly. One goal of the J580 alloy is to achieve sustained compressive yield strength comparable to nickel base alloys by forming a combined "iron+cobalt" base within a fully solid state temperature range. FIG. 9 shows a comparison of compressive yield strength as a function of temperature among J3, J10, J513, and J580. J580 (X75, Heat 8C22XA) showed a very good compressive yield strengths without rapid drop behavior within a range up to 650° C. and, the compressive yield strength of J580 is generally greater than J3 within that temperature range.

Figure 10:
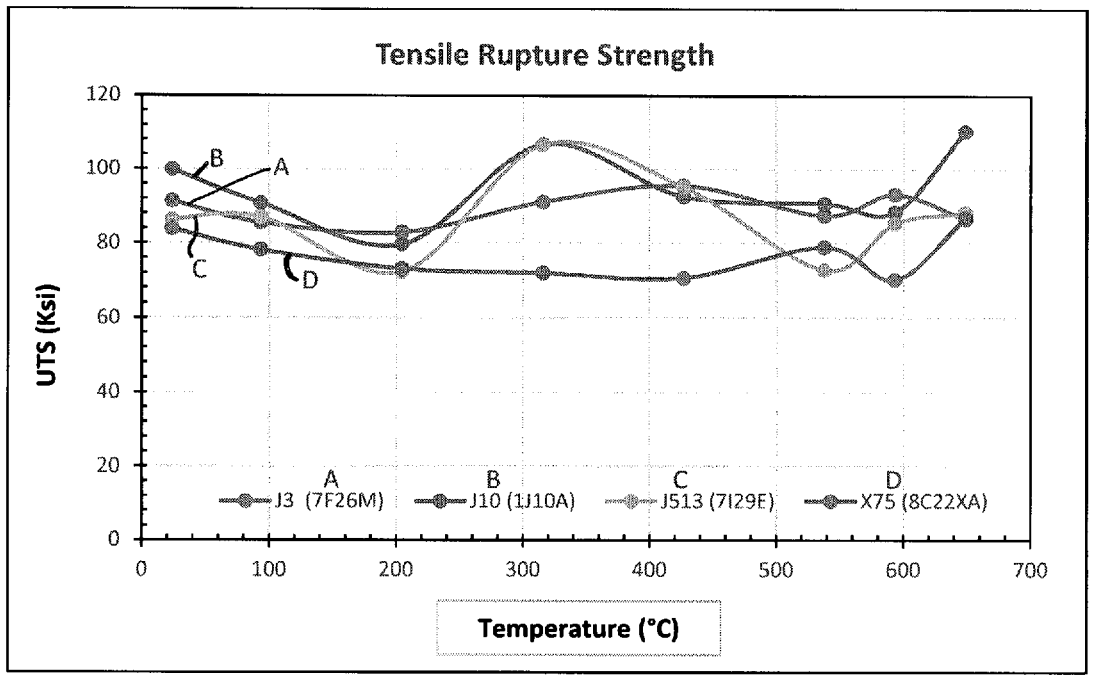
FIG. 10 is a graph of ultimate tensile strength versus temperature for several J580 alloy compositions for J580, J3, J10 and J513.

In evaluating tensile strength of the J580 alloy, it was found that Alloy J580 (X75, Heat 8C22XA) showed a sustained tensile rupture strength up to 650° C. It is at the lower end of the tensile strength band of the four alloys discussed. However, the tensile rupture strength curve as a function of temperature has clearly exhibited a sound tensile property that only slightly varies with testing temperature up to 650° C. The tensile rupture strength behavior can be beneficial to VSI applications due to lower potential stress concentration induced by alloy microstructural distribution. A comparison of ultimate tensile rupture strength for alloys J580, J3, J10, and J513 is depicted in FIG. 10.

In an evaluation of corrosion resistance, VDA immersion and condensate corrosion tests were conducted with very strong mixed acids with a pH value at 1.2 and majority of the testing cycle (6 out of 7 days) includes holding test cell at 50° C. For the 1.2 pH test, the testing solution was made based upon standard VDA test solution composition. For the 2.8 pH test, an L.E. Jones (LEJ) test solution was applied including sodium sulfate: 7800 ppm $SO_4^{-2}$; sodium nitrate: 1800 ppm $NO_3^-$ which is adjusted with acetic acid (~5 g/L) for obtaining 2.8 pH. The testing cycle and procedure for the 2.8 pH test is identical to the 1.2 pH test. Among the group of VSI alloys evaluated, J580 along with J10, J133 and J153 possessed the lowest corrosion rate. Essentially, no corrosion could be measured from immersion testing or condensate testing for these four alloys.

For the 2.8 pH immersion and condensate corrosion tests, J580 again showed no measureable corrosion rate.

Figure 11A:
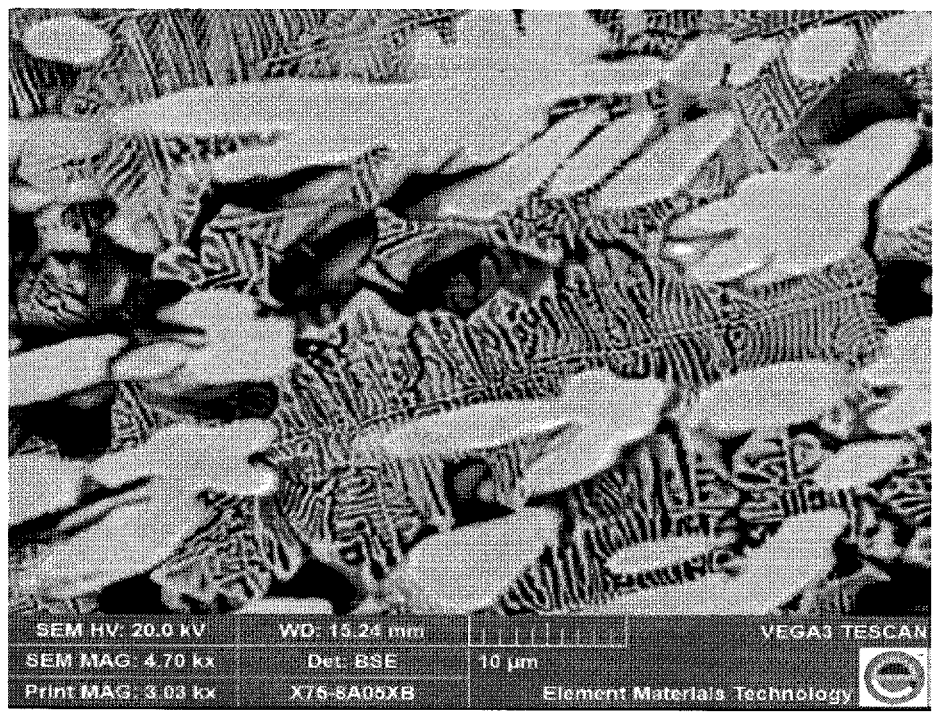
FIG. 11A and FIG. 11B are scanning electron micrographs (SEM) of a J580 alloy composition.
Figure 11B:
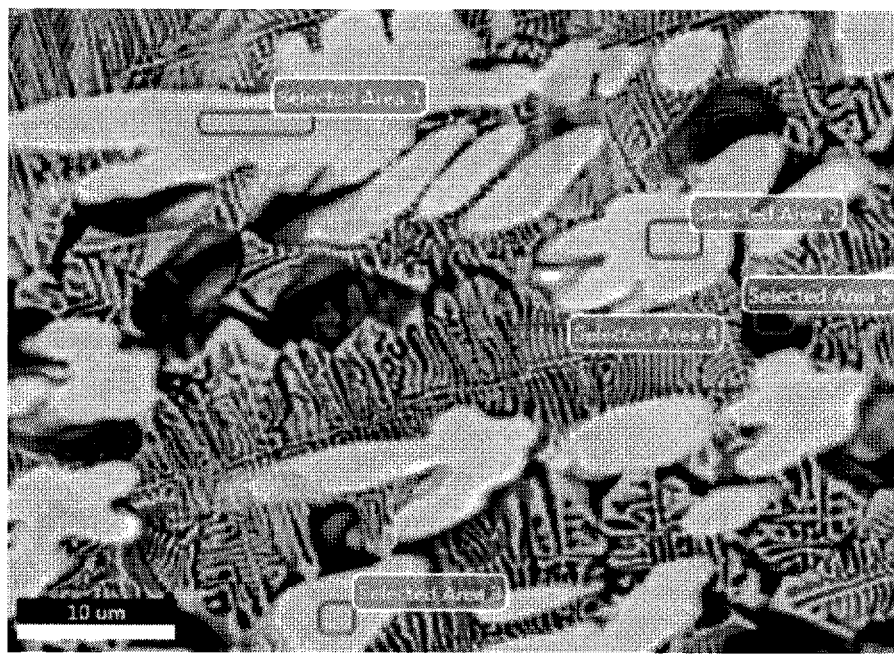
Figure 12A:
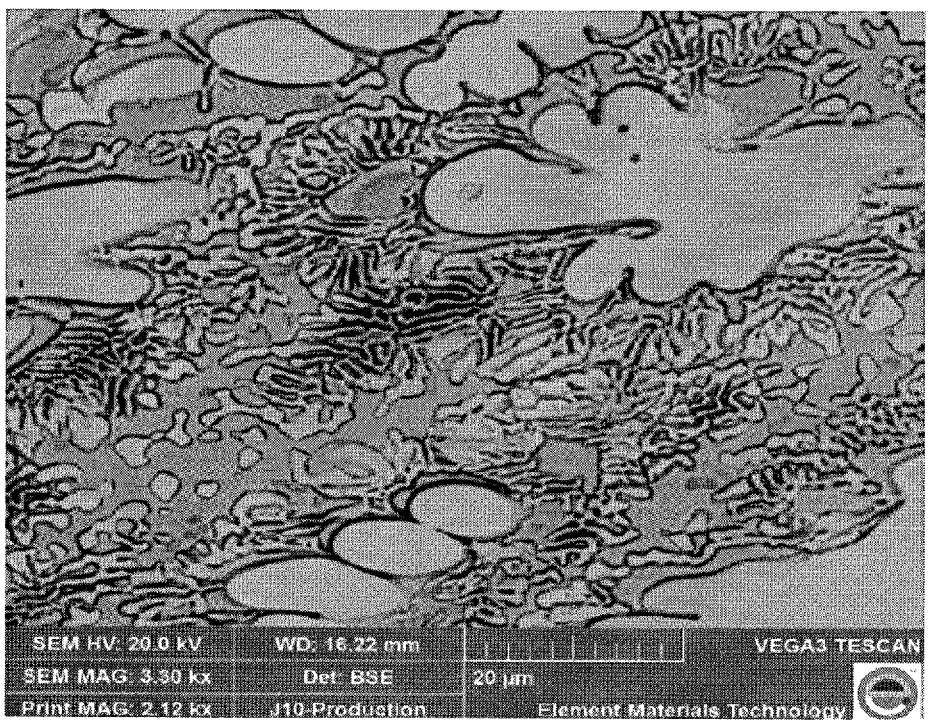
FIG. 12A and FIG. 12B are scanning electron micrographs of a J10 alloy composition.
Figure 12B:
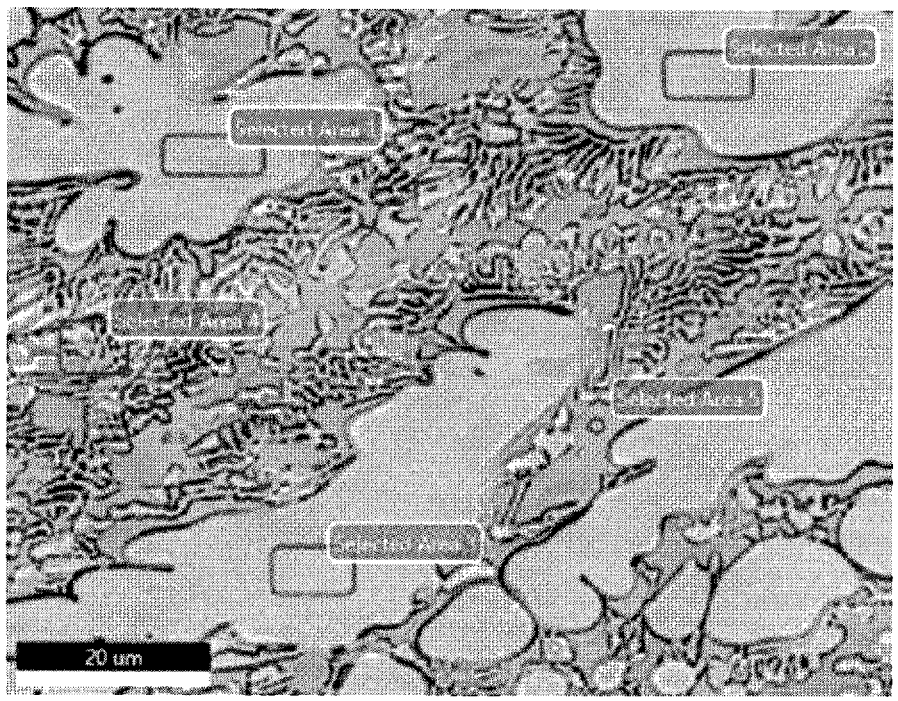

FIGS. 11A-B and FIGS. 12A-B show typical SEM microstructural morphology for J580 and J10, respectively. It should be noted that J580 showed significant high oxidation resistance and, it took more than 15 hours to etch with LEJ etchant to show the detail of the solidification substructure. However, some interdendritic areas (between Laves phase and eutectic phases) were etched out under the etching condition. On the other hand, J10 sample could be etched in a relative shorter time to show its microstructure. In addition, it should be noted that the magnification of FIGS. 11A-B and FIGS. 12A-B is different and micron markers are attached with these photos. Therefore, J580 possesses a significantly finer microstructure than J10 including the size of Laves phase. J10 is a Co-base alloy with about 60% Co, about 28% Mo, about 8% Cr, and about 2.5% Si. In FIG. 11B, Areas 1, 2 and 3 show Laves phases, Area 4 shows eutectic phases, and Area 5 shows an etched out area. Compared to J10, the Si content of the Laves phase in J580 is significantly higher than the Si content of the Laves phases of J10.

Experiments were carried out to evaluate castability of J580 and evaluate properties of J580 compared to J3 and J10 alloys available from L.E. Jones Co. The compositions of samples evaluated are set forth in the Table 6 below wherein "Rem" refers to remainder of unavoidable elements:

TABLE 6

J580 (Nos. 1-5), J3 and J10 Alloy Compositions

| No. | Co | Mo | Cr | Fe | Si | Ni | V | Mn | Nb | W | C | Rem. |
|---|---|---|---|---|---|---|---|---|---|---|---|---|
| 1 | 36 | 22 | 13 | 13 | 5 | 5 | 1 | 0.8 | 1 | 1 | 0.3 | Bal |
| 2 | 39 | 27 | 13 | 13 | 5 | | 1.75 | 0.8 | 1.25 | 1.25 | 0.3 | Bal |
| 3 | 35 | 22 | 13 | 13 | 5 | 5 | 1 | 0.8 | 1 | 1 | 0.3 | Bal |
| 4 | 35 | 26 | 13 | 13 | 5 | | 1.75 | 0.8 | 1.25 | 1.25 | 0.3 | Bal |
| 5 | 35 | 23 | 16 | 15 | 5 | | 1.75 | 0.8 | | 1.25 | 0.3 | Bal |
| J3 | 50 | | 30 | 1.5 | 0.5 | 0.3 | | 0.3 | | 13 | 2.4 | Bal |
| J10 | 60 | 28.5 | 8 | | 2.4 | | | | | | | Bal |

The J580 alloys listed in Table 6 have about 0.3% C, 5% Si, 0.8% Mn, 13-16% Cr, 13-15% Fe, 1-1.25% W, 22-27% Mo, 0-5% Ni, 35-39% Co, 1-1.75% V, 1-1.25% Nb, balance unavoidable impurities including up to 0.035% P, up to 0.015% S and up to 0.250% N.

The following Table 7 sets forth bulk hardness (HRC), peak load (lbf), deformation (inch) and radial crush toughness (8.33 ft-lb) for the samples tested.

TABLE 7

Mechanical Properties of J580 Heats 1-3 and J10

| Heat | Bulk Hardness | Peak Load | Deformation | Radial Crush Toughness |
|---|---|---|---|---|
| 1 | 53 | 1463.8 | 0.0274 | 0.401 |
| 2 | 58.5 | 1066.8 | 0.0228 | 0.244 |
| 3 | 52 | 1357.6 | 0.0263 | 0.357 |
| J10 | 57 | 631 | 0.0196 | 0.124 |

As shown above, J580 exhibits similar hardness to J10 but J580 exhibits better radial crush toughness. The alloys for Heats 1-3 and J10 were cast and examined. It was found that the 580 alloy exhibits a more homogenized (uniform) microhardness distribution compared to J10 whereas both samples exhibited similar bulk hardness. The more evenly distributed microhardness for J580 appears to be due to the finer microstructural distribution (both cobalt solid solution phase and Laves phase) compared to that of J10.

The J580 alloy compositional system can be designed to form a composite of Co—Fe face centered cubic (FCC) phase, Co—Mo—Cr—Si rich Laves phase, and small amount of carbides. A J580 sample made of Heat 8E11XB was used to conduct an x-ray diffraction assisted phase characterization. This heat was specifically made to examine a lower end of cobalt content (27.0 wt. %) for the alloy system. In addition, a higher end of iron content (23.5 wt. %) was also examined. The ratio of cobalt to iron is 1.15. The phase characterization was carried out with a SmartLab x-ray diffractometer at Rigaku and; the disk block samples with 1.25" in diameter and ½" of thickness were prepared at L. E. Jones. Both cobalt radiation and copper radiation sources were applied for this experiment and; with cobalt radiation, the x-ray diffraction spectrum resolution was significantly better than that with copper.

Two different crystalline phase quantification methods (DD and RIR) were applied and both methods were in agreement upon the identification of four major crystalline phases namely, FCC (austenite), $MoFe_2$ Laves phase, Martensite, and $Mo_6Co_6C$ carbides. Considering the results from both DD and RIR methods, the heat sample contains greater than 59% and up to 74% FCC phase and 4.9% to 13.0% martensitic phase. Therefore, the amount of austenite (FCC) plus martensite together is more than 72% or 78.9%. This is higher than the desired/expected value for the alloy system.

In the evaluation of Heats 1-3, Heat 1 was found to exhibit a binary-phase matrix and the total amount of MC carbide formers is approximately 3 wt. %. Heat 2 was found to exhibit a three-phase matrix and the total amount of carbide formers is approximately 4.25%. Heat 3 was found to exhibit a three-phase matrix and the total amount of primary MC type carbide formers is approximately 3%. Heat 3 exhibits a three-phase domain solidification substructural distribution similar to Heat 2 but with over two times more Fe than Heat 2.

The microstructures of Heats 1-3 can be summarized as follows: Heat 1 has about 34 vol. % primary intermetallic and about 66 vol. % Co solid solution; Heat 2 has about 24 vol. % secondary intermetallic, about 48 vol. % primary intermetallic and about 28 vol. % C solid solution; and Heat 3 has about 37 vol. % secondary intermetallic, about 45 vol. % primary intermetallic and about 18 vol. % Co solid solution.

Plint wear tests summarized in Table 8 were carried out with three different heats of J580 alloy samples paired with Crutonite valve material. A standard Plint testing condition including 20N applied load, 20 Hz reciprocating frequency, 1 mm stroke length, and 100,000 total testing cycles. The test temperatures for each materials pair include 23° C., 50° C., 100° C., 150° C., 200° C., 250° C., 300° C., 350° C., 400° C., 450° C. and 500° C. The mass change of both pin and plate specimens were determined by weighing pin and plate specimens before and after a test.

TABLE 8

Summary of Plint Wear Test Results

| Temperature (° C.) | J10 (1J10A) | J580 (8A16XA) X75-4 | J580 (8E03XA) X75-6 | J580 (8E04XA) X75-7 |
|---|---|---|---|---|
| Pin Specimen Wear | | | | |
| 23 | 0.4 | 0.5 | 0.2 | 0.6 |
| 50 | 0.6 | 0.9 | 0.6 | 0.8 |
| 100 | 0.6 | 0.8 | 0.7 | 0.9 |
| 150 | 0.9 | 0.9 | 1.1 | 1.0 |
| 200 | 1.1 | 0.9 | 1.2 | 1.0 |
| 250 | 1.0 | 1.0 | 1.1 | 1.1 |
| 300 | 1.4 | 1.1 | 1.5 | 1.2 |
| 350 | 1.9 | 0.4 | 1.1 | 1.0 |
| 400 | 1.4 | 0.3 | 0.6 | 0.3 |
| 450 | 0.8 | 0.2 | 0.5 | 0.1 |
| 500 | 0.3 | 0.0 | 0.0 | 0.0 |

TABLE 8-continued

Summary of Plint Wear Test Results

| Temperature (° C.) | J10 (1J10A) | J580 (8A16XA) X75-4 | J580 (8E03XA) X75-6 | J580 (8E04XA) X75-7 |
|---|---|---|---|---|
| Plate Specimen Wear | | | | |
| 23 | 1.6 | 1.4 | 1.2 | 1.2 |
| 50 | 1.0 | 1.4 | 1.4 | 1.0 |
| 100 | 1.0 | 1.1 | 1.4 | 1.0 |
| 150 | 1.2 | 1.2 | 1.4 | 1.2 |
| 200 | 1.2 | 1.1 | 2.3 | 1.5 |
| 250 | 1.4 | 1.3 | 2.3 | 1.8 |
| 300 | 1.0 | 1.5 | 2.7 | 2.4 |
| 350 | 0.5 | 1.2 | 2.0 | 2.5 |
| 400 | 0.8 | 1.0 | 2.0 | 1.6 |
| 450 | 1.2 | 0.5 | 1.5 | 0.9 |
| 500 | 0.7 | 0.5 | 0.6 | 0.6 |

Figure 13:
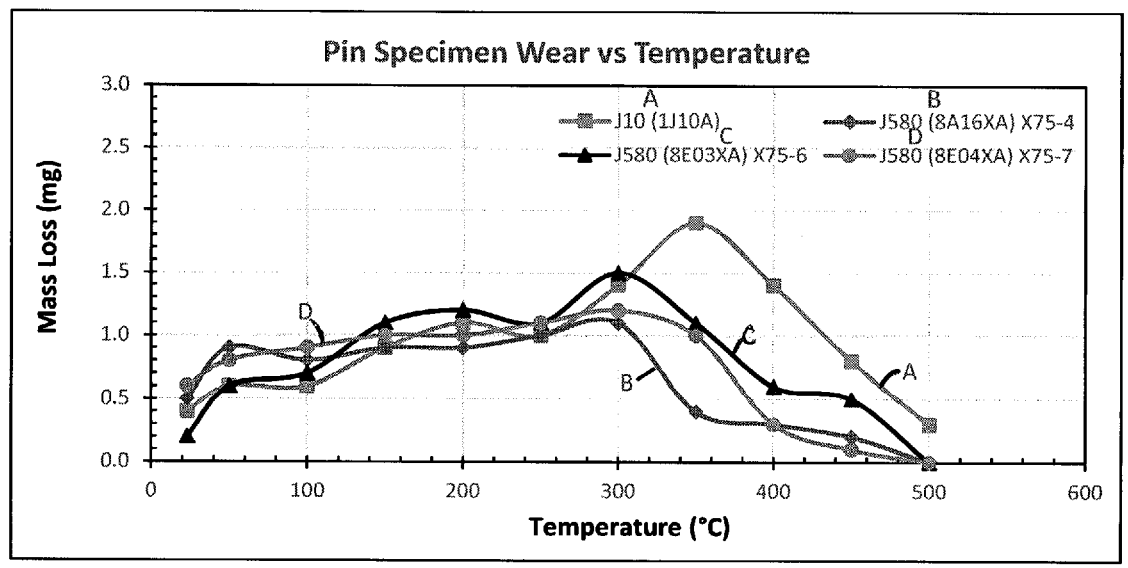
Figure 14:
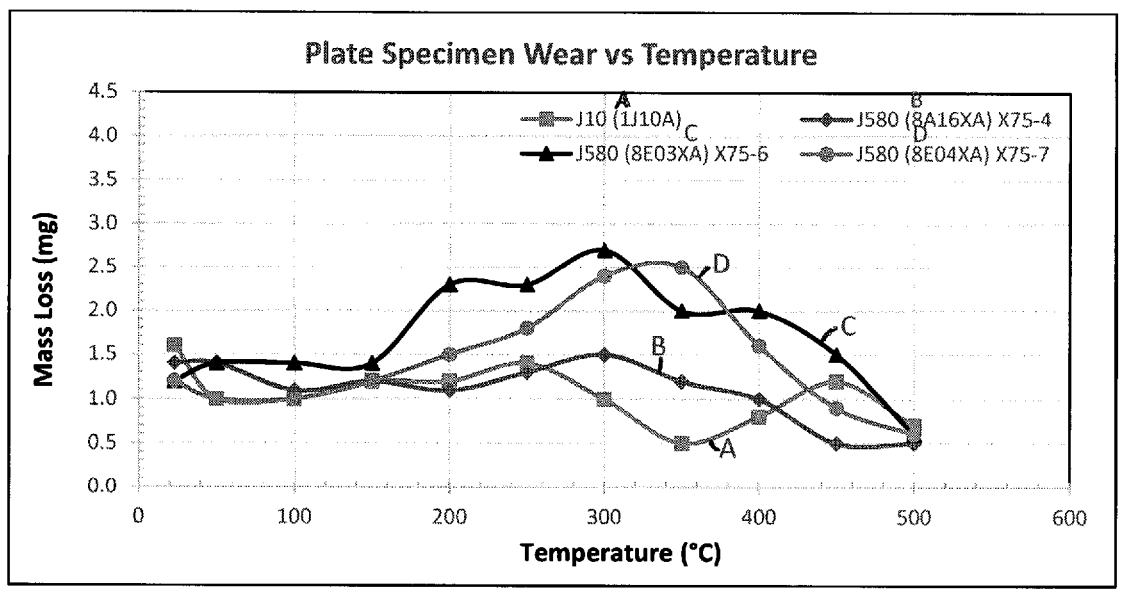
Figure 15:
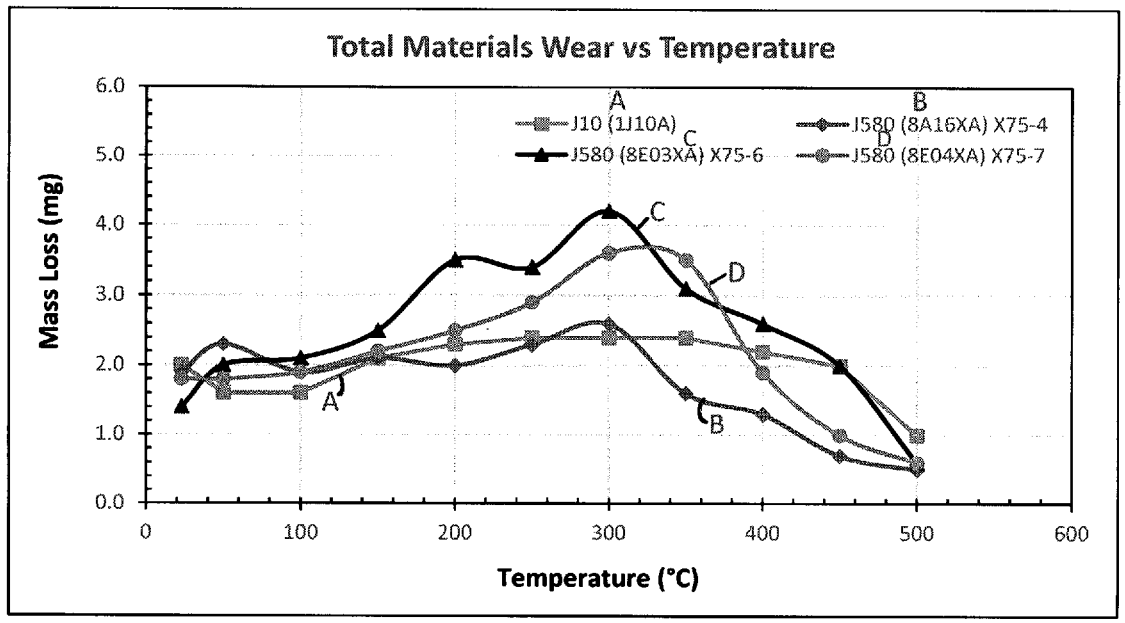

The Plint wear test results for pin, plate, and total materials wear as a function of testing temperature are shown in FIG. 13, FIG. 14 and FIG. 15, respectively wherein Curves A-D correspond to alloys J10 (1J10A), J580 (8A16XAA), J580 (8E03XA), and J580 (8E04XA), respectively. Among four materials pairs tested for this project, three are related to J580 pin materials (three different heats) and one is related to J10 pin material. All the plate specimens were extracted from Crutonite valves. All four materials pairs, in general, showed a reasonable pin to plate wear ratio for engine valvetrain applications along with amount of materials wear based upon general L. E. Jones Plint wear test criteria. Comparatively, the overall best wear resistance is from J580 (8A16XA) vs Crutonite materials pair.

Fourteen additional alloy compositions and HRc test results are set forth in the following Table 9. Table 10 provides bulk hardness versus tempering temperature data for seven of the alloys listed in Table 9.

TABLE 9

Examples of J580 Alloy Compositions in Weight %

| Heat No. | C | Si | Mn | Ni | Cr | Mo | W | V | Co | Fe | Nb | HRc |
|---|---|---|---|---|---|---|---|---|---|---|---|---|
| 9A02XA | 0.482 | 3.88 | 0.356 | 1.17 | 20.21 | 28.35 | 1.54 | 5.29 | 29.80 | 7.34 | 1.13 | 60.3 |
| 9A03XA | 0.308 | 4.41 | 0.249 | 4.18 | 14.08 | 22.26 | 2.26 | 1.76 | 33.19 | 16.08 | 0.60 | 57.0 |
| 9A03XB | 0.520 | 4.49 | 0.406 | 4.92 | 13.28 | 22.31 | 2.01 | 3.79 | 22.26 | 24.06 | 1.32 | 57.1 |
| 9A03XC | 0.520 | 4.49 | 0.465 | 6.94 | 13.27 | 21.82 | 2.33 | 4.14 | 20.82 | 23.22 | 1.33 | 50.6 |
| 9A03XD | 0.520 | 4.39 | 0.366 | 8.84 | 13.43 | 21.96 | 2.19 | 4.16 | 22.71 | 19.46 | 1.32 | 54.3 |
| 9A04XA | 0.560 | 4.57 | 0.345 | 10.58 | 13.45 | 22.29 | 3.24 | 3.97 | 21.46 | 17.98 | 1.30 | 47.4 |
| 9A04XB | 0.570 | 4.42 | 0.386 | 12.03 | 13.85 | 21.70 | 3.24 | 3.82 | 20.56 | 17.86 | 1.09 | 49.2 |
| 9B05XA | 0.530 | 3.71 | 0.570 | 0 | 13.31 | 19.02 | 2.30 | 4.71 | 22.07 | 31.27 | 1.79 | 58.8 |
| 9B05XB | 0.212 | 5.02 | 0.520 | 0 | 13.30 | 23.73 | 1.58 | 1.39 | 33.30 | 19.07 | 1.32 | 56.7 |
| 9B06XA | 0.530 | 4.24 | 0.357 | 12.31 | 13.92 | 22.31 | 3.24 | 3.31 | 21.37 | 15.68 | 2.05 | 51.5 |
| 9B22XA | 0.540 | 4.07 | 0.313 | 12.40 | 13.92 | 23.29 | 3.24 | 3.26 | 21.48 | 15.82 | 2.00 | 48.8 |
| 9C15XA | 0.355 | 4.72 | 0.224 | 17.04 | 15.39 | 22.71 | 3.22 | 1.52 | 21.35 | 12.16 | 0.66 | 50.8 |
| 9C15XB | 0.296 | 4.76 | 0.286 | 9.80 | 14.95 | 22.52 | 2.91 | 1.62 | 25.89 | 15.70 | 0.63 | 53.6 |
| 9C15XC | 0.312 | 4.63 | 0.312 | 0 | 14.74 | 22.26 | 2.57 | 1.80 | 34.37 | 17.64 | 0.65 | 59.4 |

TABLE 10

Summary of bulk hardness as a function of tempering temperature

| Temper Temperature (° F.) | Bulk Hardness vs Tempering Temperature (HRc) | | | | | | |
|---|---|---|---|---|---|---|---|
| | 9A02XA | 9A03XA | 9A03XB | 9A03XC | 9A03XD | 9A04XA | 9A04XB |
| 72 | 61.4 | 57.8 | 57.6 | 55.0 | 54.9 | 49.2 | 49.2 |
| 800 | 61.0 | 57.6 | 57.3 | 54.7 | 55.2 | 49.9 | 49.4 |
| 900 | 61.2 | 57.5 | 57.6 | 55.0 | 55.2 | 49.6 | 49.9 |
| 1000 | 61.4 | 57.4 | 57.8 | 53.5 | 54.9 | 49.2 | 49.5 |
| 1050 | 61.7 | 57.4 | 57.7 | 53.3 | 55.0 | 49.3 | 49.3 |
| 1100 | 61.1 | 57.5 | 57.7 | 54.0 | 54.9 | 49.1 | 49.5 |
| 1150 | 61.4 | 57.3 | 57.6 | 53.4 | 54.9 | 49.2 | 49.2 |
| 1200 | 61.2 | 57.3 | 57.5 | 54.3 | 55.2 | 48.8 | 49.2 |
| 1250 | 61.0 | 57.5 | 57.3 | 54.4 | 55.2 | 48.6 | 48.8 |
| 1300 | 61.3 | 57.4 | 57.5 | 54.6 | 54.0 | 49.3 | 49.5 |
| 1350 | 60.7 | 57.7 | 57.5 | 55.1 | 55.0 | 48.7 | 49.2 |
| 1400 | 61.2 | 57.5 | 57.6 | 55.2 | 54.9 | 49.1 | 49.2 |
| 1450 | 61.5 | 57.3 | 58.0 | 54.9 | 54.9 | 49.5 | 48.9 |
| 1500 | 61.8 | 57.7 | 57.8 | 53.7 | 54.6 | 50.0 | 48.8 |

The J580 alloys listed in Table 9 have about 0.2 to about 0.6% C, about 3.5 to about 5% Si, about 0.2 to about 0.6% Mn, about 13 to about 20% Cr, about 7 to about 32% Fe, about 1 to about 1.5% W, about 19 to about 29% Mo, 0 to about 17% Ni, about 20 to about 35% Co, about 1.3 to about 5.3% V, about 0.6 to about 2.1% Nb, balance unavoidable impurities including up to 0.035% P, up to 0.015% S and up to 0.250% N.

Figure 16:
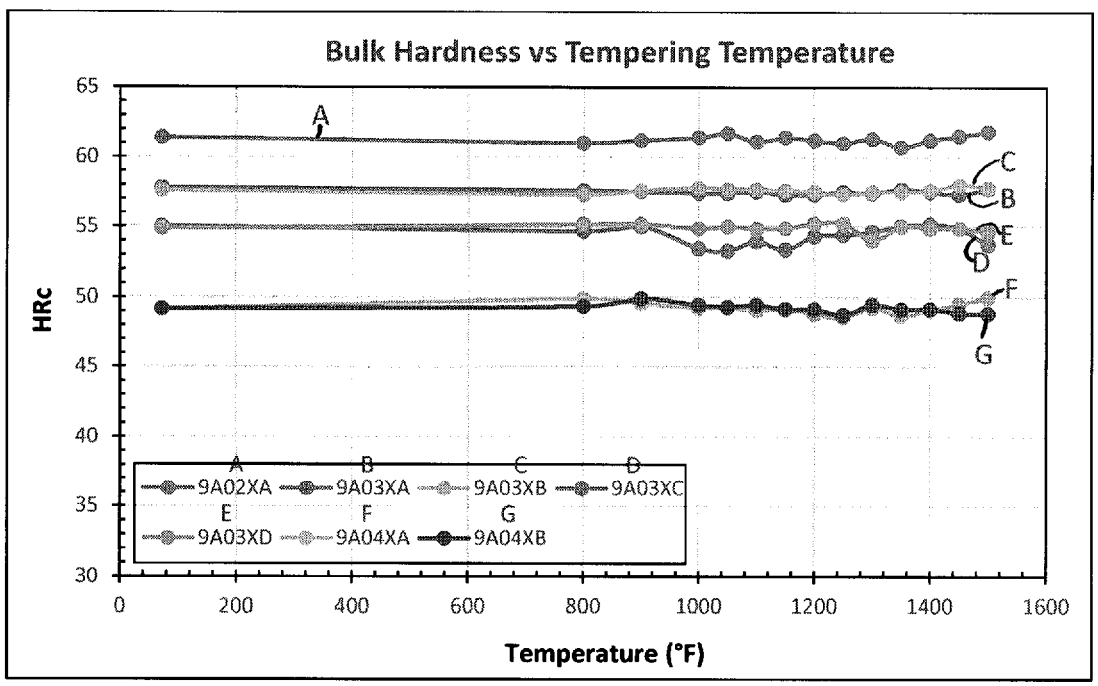
FIG. 16 shows bulk hardness versus temperature data for various J580 alloys.

The bulk hardness data listed in Table 10 is depicted in FIG. 16 wherein Curves A-G correspond to alloys 9A02XA, 9A03XA, 9A03XB, 9A03XC, 9A03XD, 9A04XA and 9A04XB, respectively. The test results indicate that tempering temperature does not significantly affect bulk hardness for the J580 heats tested.

Figure 17:
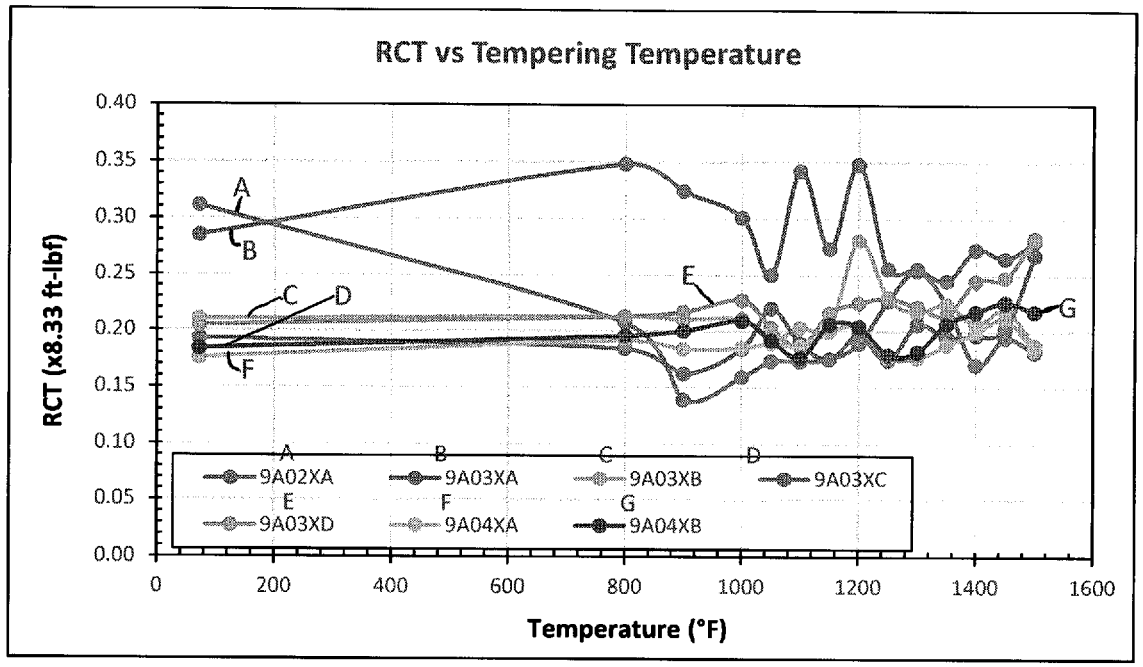
FIG. 17 shows radial crush toughness versus temperature data for various J580 alloys.

Table 11 lists the results of radial crush toughness (RCT) testing on alloys 9A02XA, 9A03XA, 9A03XB, 9A03XC, 9A03XD, 9A04XA and 9A04XB. FIG. 17 illustrates the RCT test data wherein Curves A-G correspond to alloys 9A02XA, 9A03XA, 9A03XB, 9A03XC, 9A03XD, 9A04XA and 9A04XB, respectively. As shown, heat 9A03XA exhibited the highest overall radial crush toughness compared to the other heats tested.

TABLE 11

Summary of radial crush toughness vs tempering temperature

| Temper Temperature (° F.) | Radial Crush Toughness ($8.33 \times 10^{-2}$) | | | | | | |
|---|---|---|---|---|---|---|---|
| | 9A02XA | 9A03XA | 9A03XB | 9A03XC | 9A03XD | 9A04XA | 9A04XB |
| 72 | 0.311 | 0.285 | 0.210 | 0.193 | 0.205 | 0.176 | 0.184 |
| 800 | 0.207 | 0.348 | 0.213 | 0.184 | 0.213 | 0.191 | 0.196 |
| 900 | 0.139 | 0.324 | 0.210 | 0.162 | 0.217 | 0.184 | 0.200 |
| 1000 | 0.159 | 0.301 | 0.211 | 0.184 | 0.227 | 0.185 | 0.209 |
| 1050 | 0.173 | 0.250 | 0.192 | 0.220 | 0.203 | 0.189 | 0.192 |
| 1100 | 0.173 | 0.342 | 0.203 | 0.189 | 0.186 | 0.187 | 0.176 |
| 1150 | 0.175 | 0.274 | 0.204 | 0.175 | 0.216 | 0.199 | 0.206 |
| 1200 | 0.189 | 0.348 | 0.281 | 0.196 | 0.225 | 0.205 | 0.204 |
| 1250 | 0.227 | 0.256 | 0.230 | 0.174 | 0.230 | 0.177 | 0.179 |
| 1300 | 0.254 | 0.256 | 0.217 | 0.206 | 0.222 | 0.176 | 0.182 |
| 1350 | 0.224 | 0.245 | 0.224 | 0.195 | 0.214 | 0.187 | 0.207 |
| 1400 | 0.170 | 0.273 | 0.206 | 0.196 | 0.245 | 0.199 | 0.217 |
| 1450 | 0.194 | 0.265 | 0.219 | 0.202 | 0.248 | 0.211 | 0.226 |
| 1500 | 0.181 | 0.280 | 0.188 | 0.268 | 0.283 | 0.183 | 0.217 |

Multiple linear regression was made using bulk hardness and radial crush toughness as a function of alloying elements for the J580 alloy. For bulk hardness, Equations 4 and 5 were obtained from the regression process wherein the elements in parenthesis represent the amount of each element:

$$HRc = -479 + 57.0(C) - 11.8(Mn) + 15.0(Si) + 5(Ni) + 10.7(Cr) + 0.65(Mo) - 5.15(W) + 1.13(V) + 5.6(Co) + 5.3(Fe) + 11.8(Nb).$$  Equation 4:

$$RCT = -0.1038 - 2.283(C) + 1.478(Mn) - 0.1123(Si) + 0.03739(Ni) - 0.07174(Cr) + 0.09685(Mo).$$  Equation 5:

As shown in Equation 5, increasing Mn, Ni and Mo and/or lowering C, Si and Cr contents can increase the radial crush toughness.

Five Experimental Heats, 8A05XA, 8B13XA, 8C22XA, 8E03XA, and 8E04XA were tested to evaluate tensile rupture strength. The compositions and tensile test results for these heats are summarized in Table 12 and Table 13, respectively. Iron contents of these J580 heats are within a range of about 16 to about 24 wt. %. In comparison to the J580 alloy, commercial TRIBALOYS T400 and T800 have a substantially lower iron content (<3 wt. %) along with much higher cobalt content (60 wt. % Co and 51 wt. % Co for T400 and T800, respectively) as listed in Table 14.

TABLE 12

Composition of Experimental Heats

| Heat | C | Si | Mn | Ni | Cr | Mo | W | V | Co | Fe | S | Nb |
|---|---|---|---|---|---|---|---|---|---|---|---|---|
| 8A05XA | 0.430 | 4.21 | 1.10 | 3.55 | 12.35 | 22.22 | 1.05 | 2.02 | 28.68 | 22.63 | 0.003 | 1.32 |
| 8B13XA | 0.412 | 4.45 | 0.99 | 0.53 | 19.29 | 19.38 | 1.33 | 3.77 | 28.74 | 20.57 | 0.004 | 0.10 |
| 8C22XA | 0.489 | 4.45 | 0.76 | 3.16 | 13.91 | 21.44 | 1.17 | 1.52 | 35.08 | 16.46 | 0.005 | 1.16 |
| 8E03XA | 0.481 | 4.29 | 0.80 | 3.53 | 11.86 | 21.58 | 1.29 | 4.25 | 26.52 | 23.34 | 0.005 | 1.60 |
| 8E04XA | 0.187 | 3.84 | 0.95 | 0.74 | 14.83 | 21.89 | 1.39 | 3.79 | 30.93 | 19.08 | 0.005 | 1.95 |

The P contents of the above alloy heats were 0.025%, 0.022%, 0.025%, 0.023% and 0.027%, respectively.

TABLE 13

Summary of Tensile Rupture Strength Results

| Test Temperature °F. | UTS (ksi) | | | | |
|---|---|---|---|---|---|
| | 8A05XA | 8B13XA | 8C22XA | 8E03XA | 8E04XA |
| 72 | 85.6 | 55.2 | 99.8 | 64.0 | 21.4 |
| 200 | 81.9 | 56.0 | 90.7 | 55.6 | 41.6 |
| 400 | 72.9 | 44.5 | 79.6 | 50.7 | 23.1 |
| 600 | 71.0 | 54.8 | 106.6 | 52.8 | 29.4 |
| 800 | 69.5 | 48.7 | 92.5 | 52.1 | 41.1 |
| 1000 | 80.3 | 55.6 | 90.6 | 59.3 | 31.4 |
| 1100 | 75.4 | 58.6 | 88.3 | 64.5 | 18.9 |
| 1200 | 80.8 | 38.5 | 110.2 | 51.6 | 8.1 |

TABLE 14

Nominal Composition of Commercial Tribaloys T400 and T800

| Alloys | Co at % (wt. %) | Cr at. % (wt %) | Mo at. % (wt. %) | Si at. % (wt %) | C (wt %) | Others |
|---|---|---|---|---|---|---|
| T400 | Bal. | 10.4 (8.5) | 18.8 (28.5) | 5.9 (2.6) | (<0.1) | Ni, Fe |
| T800 | Bal. | 20.8 (17.5) | 18.4 (28.5) | 7.7 (3.5) | (<0.1) | Ni, Fe |

The J580 alloys listed in Table 12 have about 0.18 to about 0.5% C, about 3.8 to about 4.5% Si, about 0.7 to about 1.1% Mn, about 11 to about 20% Cr, about 16 to about 24% Fe, about 1 to about 1.4% W, about 19 to about 23% Mo, about 0.5 to about 4% Ni, about 26 to about 35% Co, about 1.5 to about 4.3% V, about 0.1 to about 2% Nb, balance unavoidable impurities including up to 0.035% P, up to 0.015% S and up to 0.250% N.

Figure 18:
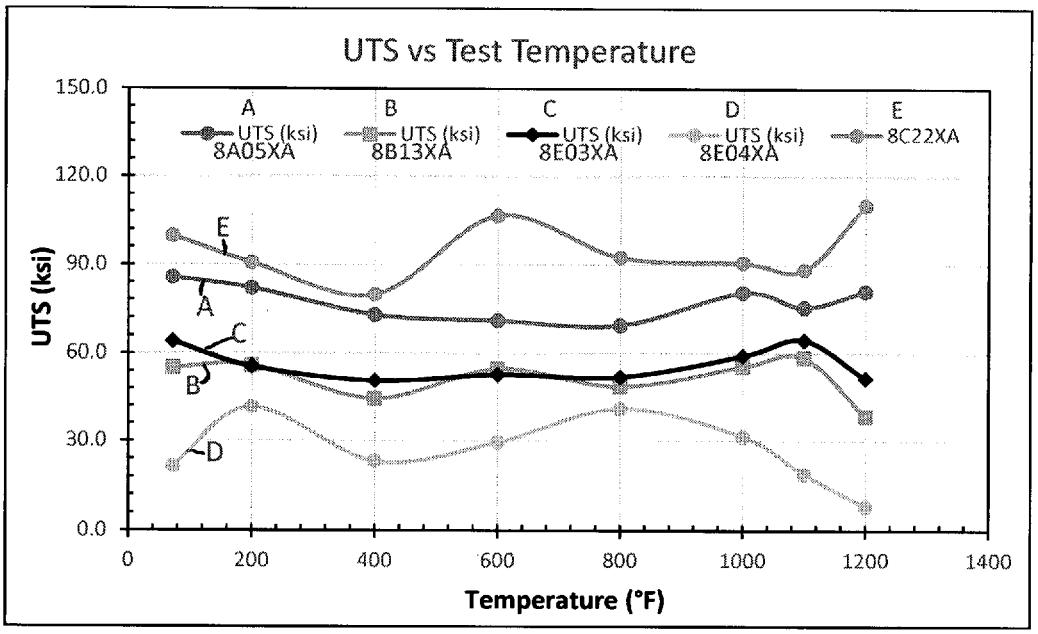
FIG. 18 shows UTS versus test temperature for various J580 alloys.

For the intended alloy applications, the ultimate tensile strength (UTS) is preferably equal to or greater than 50.0 ksi at ambient and elevated temperatures is preferred. Referring to Tables 11 and 12, when the C+Si content is greater than 4.86 wt. %, it is possible to achieve 50.0 ksi UTS from ambient through 1200° F. Therefore, the carbon+silicon content in Heat 8E04XA will not achieve the preferred 50 ksi UTS. In addition, to achieve 50 ksi UTS, the carbon content should be greater than 0.187 wt. %. FIG. 18 plots UTS versus test temperature for heats 8A05XA (Curve A), 8B13XA (Curve B), 8E03XA (Curve C), 8E04XA (Curve D), and 8C22XA (Curve E). The effect of low carbon and carbon plus silicon on reducing the tensile rupture strength of the J580 alloy system can be seen by Curve D in FIG. 18.

Based on the properties of Heat 8B13XA, in order to attain the preferred 50 ksi UTS, several conditions must be met: (1) adding a predetermined amount of carbon; (2) adding a predetermined amount of carbon plus silicon; and/or (3) adding a predetermined amount of niobium. For example, a preferred niobium content is within a range of about 1.60 wt. % to about 1.95 wt. % in order to obtain a UTS greater than 50 ksi at 1200° F.

The J580 alloy includes C, Mn, Si, Cr, Fe, W, Mo, V and/or Nb, Co, optional Ni, and unavoidable impurities. In general, the J580 alloy can include: C in any amount falling within the range of 0.1 to 0.8%, Mn in any amount falling within the range of 0.1 to 1.5%, Si in any amount falling within the range of 3 to 5%, Cr in any amount falling within the range of 10 to 20%, Fe in any amount falling within the range of 5 to 32%, W in any amount falling within the range of 0.5 to 4%, Mo in any amount falling within the range of 10 to 30%, Ni in any amount falling within the range of 0 to 20%, Co in any amount falling within the range of 20 to 40%, V in any amount falling within the range of 0 to 6%, Nb in any amount falling within the range of 0 to 3%, total V plus Nb in any amount falling within the range of 0.5 to 8.5%, balance unavoidable impurities including up to 0.035% P, up to 0.015% S and up to 0.250% N. For example, the J580 alloy can include C in any amount falling within the ranges of 0.1-0.2%, 0.2-0.3%, 0.3-0.4%, 0.4-0.5%, 0.5-0.6%, 0.6-0.7%, or 0.7-0.8%; Mn in any amount falling within the ranges of 0.1-0.2%, 0.2-0.3%, 0.3-0.4%, 0.4-0.5%, 0.5-0.6%, 0.6-0.7%, 0.7-0.8%, 0.8-0.9%, 0.9-1.0%, 1.0-1.1%, 1.1-1.2%, 1.2-1.3%, 1.3-1.4%, or 1.4-1.5%; Si in any amount falling within the ranges of 3.0-3.1%, 3.1-3.2%, 3.3-3.4%, 3.4-3.5%, 3.5-3.6%, 3.6-3.7%, 3.7-3.8%, 3.8-3.9%, 3.9-4.0%, 4.0-4.1%, 4.1-4.2%, 4.3-4.4%, 4.4-4.5%, 4.5-4.6%, 4.6-4.7%, 4.7-4.8%, 4.8-4.9%, or 4.9-5.0%; Cr in any amount falling within the ranges of 10-11%, 11-12%, 12-13%, 13-14%, 14-15%, 15-16%, 16-17%, 17-18%, 18-19%, or 19-20%; Fe in any amount falling within the ranges of 5-6%, 6-7%, 7-8%, 8-9%, 9-10%, 10-11%, 11-12%, 12-13%, 13-14%, 14-15%, 15-16%, 16-17%, 17-18%, 18-19%, 19-20%, 20-21%, 21-22%, 22-23%, 23-24%, 24-25%, 25-26%, 26-27%, 27-28%, 28-29%, 29-30%, 30-31%, or 31-32%; W in any amount falling within the ranges of 0.5-0.6%, 0.6-0.7%, 0.7-0.8%, 0.8-0.9%, 0.9-1.0%, 1.0-1.1%, 1.1-1.2%, 1.2-1.3%, 1.3-1.4%, 1.4-1.5%, 1.5-1.6%, 1.6-1.7%, 1.7-1.8%, 1.8-1.9%, 1.9-2.0%, 2.0-2.1%, 2.1-2.2%, 2.3-2.4%, 2.4-2.5%, 2.5-2.6%, 2.6-2.7%, 2.7-2.8%, 2.8-2.9%, 2.9-3.0%, 3.0-3.1%, 3.1-3.2%, 3.3-3.4%, 3.4-3.5%, 3.5-3.6%, 3.6-3.7%, 3.7-3.8%, 3.8-3.9%, or 3.9-4.0%; Mo in any amount falling within the ranges of 10-11%, 11-12%, 12-13%, 13-14%, 14-15%, 15-16%, 16-17%, 17-18%, 18-19%, 19-20%, 20-21%, 21-22%, 22-23%, 23-24%, 24-25%, 25-26%, 26-27%, 27-28%, 28-29%, 29-30%, 30-31%, 31-32%, 32-33%, 33-34%, 34-35%, 35-36%, 36-37%, 37-38%, 38-39%, or 39-40%; Ni in any amount falling within the ranges of 0-1%, 1-2%, 2-3%, 3-4%, 4-5%, 5-6%, 6-7%, 7-8%, 8-9%, 9-10%, 10-11%, 11-12%, 12-13%, 13-14%, 14-15%, 15-16%, 16-17%, 17-18%, 18-19%, or 19-20%; Co in any amount falling within the ranges of 20-21%, 21-22%, 22-23%, 23-24%, 24-25%, 25-26%, 26-27%, 27-28%, 28-29%, 29-30%, 30-31%, 31-32%, 32-33%, 33-34%, 34-35%, 35-36%, 36-37%, 37-38%, 38-39%, or 39-40%; V in any amount falling within the ranges of 0-0.1%, 0.1-0.2%, 0.2-0.3%, 0.3-0.4%, 0.4-0.5%, 0.5-0.6%, 0.6-0.7%, 0.7-0.8%, 0.8-0.9%, 0.9-1.0%, 1.0-1.1%, 1.1-1.2%, 1.2-1.3%, 1.3-1.4%, 1.4-1.5%, 1.5-1.6%, 1.6-1.7%, 1.7-1.8%, 1.8-1.9%, 1.9-2.0%, 2.0-2.1%, 2.1-2.2%, 2.3-2.4%, 2.4-2.5%, 2.5-2.6%, 2.6-2.7%, 2.7-2.8%, 2.8-2.9%, 2.9-3.0%, 3.0-3.1%, 3.1-3.2%, 3.3-3.4%, 3.4-3.5%, 3.5-3.6%, 3.6-3.7%, 3.7-3.8%, 3.8-3.9%, 3.9-4.0%, 4.0-4.1%, 4.1-4.2%, 4.3-4.4%, 4.4-4.5%, 4.5-4.6%, 4.6-4.7%, 4.7-4.8%, 4.8-4.9%, 4.9-5.0%, 5.0-5.1%, 5.1-5.2%, 5.3-5.4%, 5.4-5.5%, 5.5-5.6%, 5.6-5.7%, 5.7-5.8%, 5.8-5.9%, 5.9-6.0%; Nb in any amount falling within the ranges of 0-0.1%, 0.1-0.2%, 0.2-0.3%, 0.3-0.4%, 0.4-0.5%, 0.5-0.6%, 0.6-0.7%, 0.7-0.8%, 0.8-0.9%, 0.9-1.0%, 1.0-1.1%, 1.1-1.2%, 1.2-1.3%, 1.3-1.4%, 1.4-1.5%, 1.5-1.6%, 1.6-1.7%, 1.7-1.8%, 1.8-1.9%, 1.9-2.0%, 2.0-2.1%, 2.1-2.2%, 2.3-2.4%, 2.4-2.5%, 2.5-2.6%, 2.6-2.7%, 2.7-2.8%, or 2.9-3.0%; total V plus Nb in any amount falling within the ranges of 0.5-1.0%, 1.0-1.5%, 1.5-2.0%, 2.0-2.5%, 2.5-3.0%, 3.0-3.5%, 3.5-4.0%, 4.0-4.5%, 4.5-5.0%, 5.0-5.5%, 5.5-6.0%, 6.0-6.5%, 6.5-7.0%, 7.0-7.5%, 7.5-8.0%, or 8.0-8.5%, balance unavoidable impurities including up to 0.035% P, up to 0.015% S and up to 0.250% N.

In order to achieve tensile rupture strengths of at least about 50 ksi over a temperature range of room temperature to 1200° F., the J580 alloy can have about 0.4 to about 0.6% C, about 4.0 to about 5.0% Si, about 0.7 to about 1.2% Mn, about 0.5 to about 4.0% Ni, about 11 to about 20% Cr, about 19 to about 23% Mo, about 1.0 to about 1.5% W, about 1.5 to about 4.5% V, about 26 to about 35% Co, about 16 to about 24% Fe, about 0.1 to about 1.6% Nb, balance unavoidable impurities including up to 0.035% P, up to 0.015% S and up to 0.250% N. To achieve tensile rupture strengths of at least about 70 ksi over a temperature range of room temperature to 1200° F., the J580 alloy can have about 0.45 to about 0.55% C, about 4.2 to about 4.7% Si, about 0.7 to about 0.8% Mn, about 2.5 to about 3.5% Ni, about 13 to about 15% Cr, about 21 to about 22% Mo, about 1.1 to about 1.3% W, about 1.3 to about 1.7% V, about 33 to about 37% Co, about 15 to about 18% Fe, about 1.0 to about 1.4% Nb, total V plus Nb of about 2.5 to about 2.9%, balance unavoidable impurities including up to 0.035% P, up to 0.015% S and up to 0.250% N.

The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A cobalt-rich wear resistant and corrosion resistant alloy comprising, in weight %:
   about 0.1 to about 0.8% C;
   about 0.1 to about 1.5% Mn;
   about 3 to about 5% Si;
   about 10 to about 20% Cr;
   about 5 to about 32% Fe;
   about 0.5 to about 4% W;
   about 19 to about 30% Mo;
   about 0 to about 20% Ni;
   about 20 to about 40% Co;
   up to about 6% V;
   up to about 3% Nb;
   total V plus Nb of about 0.5 to about 8.5%; and
   balance unavoidable impurities.

2. The alloy of claim 1, wherein C is about 0.2 to about 0.5%, Mn is about 0.2 to about 0.8%, Si is about 3.5 to about 4.5%, Cr is about 13 to about 20%, Fe is about 12 to about 32%, W is about 1 to about 4% W, Mo is about 19 to about 28%, Ni is about 0 to about 5%, Co is about 20 to about 35%, V is about 3 to about 4%, and Nb is about 1 to about 2%.

3. The alloy of claim 1, having a microstructure comprising matrix phases of cobalt solid solution and Laves phases and uniformly distributed MC type carbides in the cobalt solid solution matrix.

4. The alloy of claim 3, wherein the solid solution matrix is a face-centered cubic solid solution with NbC and/or VC precipitates therein.

5. The alloy of claim 3, further comprising interdendritic primary eutectic phases.

6. A valve seat insert made of the alloy of claim 1.

7. The valve seat insert of claim 6, wherein C is about 0.18 to about 0.52%, Mn is about 0.7 to about 1.2%, Si is about 3.5 to about 4.6%, Cr is about 11 to about 15%, Fe is about 16 to about 27%, W is about 1 to about 1.5%, Mo is about 19 to about 23%, Ni is about 0.7 to about 4%, Co is about 26 to about 36%, V is about 1.3 to about 4%, and Nb is about 1.2 to about 2.3%.

8. The valve seat insert of claim 6, wherein the valve seat insert is a casting and the microstructure includes 40 to 60% by volume Laves phases and 40 to 60% by volume cobalt solid solution phases.

9. The valve seat insert of claim 6, wherein the valve seat insert has an as-cast hardness from about 50 to about 66 Rockwell C at 75 to 1000° F., a compressive yield strength from about 100 ksi to about 150 ksi from 75 to 1000° F.; and/or an ultimate tensile strength from about 70 ksi to about 100 ksi from 75 to 1000° F.

10. The valve seat insert of claim 6, wherein C is 0.2 to 0.5%, Mn is 0.2 to 0.8%, Si is 3.5 to 4.5%, Cr is 13 to 20%, Fe is 12 to 32%, W is 1 to 4% W, Mo is 19 to 28%, Ni is from 0 to 5%, Co is 20 to 35%, V is 3 to 4%, and Nb is 1 to 2%.

11. The valve seat insert of claim 6, wherein the valve seat insert exhibits a dimensional stability of less than about $0.25 \times 10^{-3}$ inches per inch of insert outside diameter (O.D.) after about 20 hours thermal soaking at about 1200° F.

12. The valve seat insert of claim 6, wherein the valve seat insert exhibits a decrease in hardness of 10% or less when heated from about room temperature to about 1000° F.

13. A method of manufacturing an internal combustion engine comprising inserting the valve seat insert of claim 6 in a cylinder head of the internal combustion engine.

14. The method of claim 13, wherein the engine is a diesel engine.

15. A method of operating an internal combustion engine comprising closing a valve against the valve seat insert of claim 6 to close a cylinder of the internal combustion engine and igniting fuel in the cylinder to operate the internal combustion engine.

16. The method of claim 15, wherein the engine is a diesel engine.

17. The method of claim 15, wherein the valve: (i) is composed of a high-temperature, nickel-chromium alloy strengthened by precipitation hardening; or a high-temperature, nickel-based superalloy; or (ii) the valve is hard-faced with a high temperature, wear-resistant cobalt-based alloy strengthened by carbides; or is hard-faced with a high-temperature, wear-resistant cobalt-based alloy strengthened by Laves phases.

18. A method of making a cobalt-rich wear resistant and corrosion resistant alloy according to claim 1 wherein the alloy is melted and cast from a melt at a temperature of from about 2800 to about 3000° F.; or the alloy is pre-alloyed powder which is compressed into a shaped component and sintered at a temperature from about 2000 to about 2350° F.

19. The method of claim 18, wherein the alloy is cast from a melt at a temperature from about 2875 to about 2915° F.; the method further comprising heating the cast alloy at a temperature from about 1300 to about 1500° F. for about 2 to about 10 hours in an inert, oxidizing, reducing atmosphere or in a vacuum.

* * * * *